(12) United States Patent
Beser

(10) Patent No.: US 8,627,320 B2
(45) Date of Patent: *Jan. 7, 2014

(54) SYSTEMS AND METHODS FOR SCHEDULING APPLICATIONS

(75) Inventor: Nurettin Burcak Beser, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 323 days.

This patent is subject to a terminal disclaimer.

(21) Appl. No.: 12/771,931

(22) Filed: Apr. 30, 2010

(65) Prior Publication Data

US 2010/0235512 A1    Sep. 16, 2010

Related U.S. Application Data

(63) Continuation of application No. 10/283,216, filed on Oct. 30, 2002, now Pat. No. 7,748,002.

(60) Provisional application No. 60/334,727, filed on Oct. 31, 2001.

(51) Int. Cl.
*G06F 9/46* (2006.01)
*G01R 31/08* (2006.01)

(52) U.S. Cl.
USPC .......................... 718/102; 718/104; 370/230

(58) Field of Classification Search
None
See application file for complete search history.

(56) References Cited

U.S. PATENT DOCUMENTS

| | | | |
|---|---|---|---|
| 5,519,689 A * | 5/1996 | Kim | 370/232 |
| 5,680,323 A * | 10/1997 | Barnard | 715/720 |
| 5,745,767 A * | 4/1998 | Rosen et al. | 717/124 |
| 6,031,841 A | 2/2000 | Woundy | |
| 6,223,222 B1 | 4/2001 | Fijolek et al. | |
| 6,275,843 B1 | 8/2001 | Chorn | |
| 6,412,000 B1 | 6/2002 | Riddle et al. | |
| 6,457,051 B1 | 9/2002 | Riddle et al. | |
| 6,519,636 B2 | 2/2003 | Engel et al. | |
| 6,590,885 B1 | 7/2003 | Jorgensen | |
| 6,591,299 B2 | 7/2003 | Riddle et al. | |
| 6,636,485 B1 | 10/2003 | Fijolek et al. | |
| 6,640,248 B1 | 10/2003 | Jorgensen | |
| 6,647,419 B1 | 11/2003 | Mogul | |
| 6,687,222 B1 | 2/2004 | Albert et al. | |
| 6,917,614 B1 | 7/2005 | Laubach et al. | |
| 7,185,094 B2 * | 2/2007 | Marquette et al. | 709/225 |
| 7,216,348 B1 | 5/2007 | DeCarmo | |
| 7,281,043 B1 * | 10/2007 | Davie | 709/226 |
| 7,444,407 B2 | 10/2008 | Thomas | |
| 2002/0075875 A1 | 6/2002 | Dravida et al. | |
| 2002/0143939 A1 | 10/2002 | Riddle et al. | |
| 2003/0005144 A1 | 1/2003 | Engel et al. | |
| 2003/0103527 A1 | 6/2003 | Beser | |
| 2003/0142690 A1 | 7/2003 | Beser | |
| 2004/0243999 A1 * | 12/2004 | Taivalsaari | 718/1 |

OTHER PUBLICATIONS

Co-pending U.S. Appl. No. 10/283,216, filed Oct. 30, 2002 entitled "Systems and Methods for Scheduling Applications" by Nurettin Burcak Beser, 72 pages.

(Continued)

*Primary Examiner* — Camquy Truong
(74) *Attorney, Agent, or Firm* — Harrity & Harrity, LLP

(57) ABSTRACT

A system allocates resources in a network. The system receives an allocation request for a first flow and a second flow from an application and identifies the application based on the allocation request. The system schedules resources for the first flow based on the identification of the application and the second flow.

21 Claims, 16 Drawing Sheets

(56) References Cited

OTHER PUBLICATIONS

Cisco 7920 Wireless IP Phone Design and Deployment Guide, Chapter 6—"Quality of Service" (Oct. 2005).

Sunkad, Ph.D., "Quality-of-Service: A DOCSIS/PacketCable™ Perspective—Part I," cablelabs.com/about_cl/SPECS/MayJune2000/news.pgs/sotry5.html, Jul. 17, 2002 print date, pp. 1-7.

"PacketCable™ Dynamic Quality-of-Service Specification," PKT-SP-DQOS-I103-020116, Copyright 1999-2000 Cable Television Laboratories, Inc., Jan. 16, 2002, 233 pages.

* cited by examiner

| Service Flow Parameter | Best Effort | Non-Real-Time Polling | Real-Time Polling | Unsolicited Grant | Unsolicited Grant with Activity Det. |
|---|---|---|---|---|---|
| Miscellaneous | | | | | |
| • Traffic Priority | Optional Default = 0 | Optional Default = 0 | N/A[a] | N/A | N/A |
| • Max Concatenated Burst | Optional | Optional | Optional | N/A | N/A |
| • Upstream Scheduling Service Type | Optional Default = 2 | Mandatory | Mandatory | Mandatory | Mandatory |
| • Request/Transmission Policy | Optional Default = 0 | Mandatory | Mandatory | Mandatory | Mandatory |
| Maximum Rate | | | | | |
| • Max Sustained Traffic Rate | Optional Default = 0 | Optional Default = 0 | Optional Default = 0 | N/A | N/A |
| • Max Traffic Burst | Optional Dflt = 1522 | Optional Dflt = 1522 | Optional Dflt = 1522 | N/A | N/A |
| Minimum Rate | | | | | |
| • Min Reserved Traffic Rate | Optional Default = 0 | Optional Default = 0 | Optional Default = 0 | N/A | N/A |
| • Assumed Minimum … Packet Size | Optional* | Optional* | Optional* | Optional* | Optional* |
| Grants | | | | | |
| • Unsolicited Grant Size | N/A | N/A | N/A | Mandatory | Mandatory |
| • Grants per Interval | N/A | N/A | N/A | Mandatory | Mandatory |
| • Nominal Grant Interval | N/A | N/A | N/A | Mandatory | Mandatory |
| • Tolerated Grant Jitter | N/A | N/A | N/A | Mandatory | Mandatory |
| Polls | | | | | |
| • Nominal Polling Interval | N/A | Optional* | Mandatory | N/A | Optional[b] |
| • Tolerated Poll Jitter | N/A | N/A | Optional* | N/A | Optional* |

FIG. 7

SYSTEMS AND METHODS FOR SCHEDULING APPLICATIONS

RELATED APPLICATION

This application is a continuation of U.S. application Ser. No. 10/283,216, filed Oct. 30, 2002, now U.S. Pat. No. 7,748,002, issued Jun. 29, 2010, which claims priority under 35 U.S.C. §119 based on U.S. Provisional Application No. 60/334,727, filed Oct. 31, 2001, the disclosures of which are incorporated herein by reference.

FIELD OF THE INVENTION

The present invention relates generally to communications systems and, more particularly, to systems and methods for scheduling resources in a cable modem network.

BACKGROUND OF THE INVENTION

Recently, there has been an explosive demand for services, such as data, voice, and video, to be delivered over broadband communications systems. Cable modem technology is one method of providing such broadband services to subscribers. Cable modem technology competes with technologies such as Asymmetric Digital Subscriber Lines (ADSL) and Integrated Services Digital Network (ISDN). Many in the industry forecast that cable modem systems will become the prevailing technology for providing broadband services since cable television is already widely in use.

FIG. 1 illustrates a simplified diagram of a conventional cable modem system. The DOCSIS (Data Over Cable Service Interface Specifications) Radio Frequency Interface Standard specifies the transfer of Internet Protocol (IP) traffic, between the cable headend system and customer locations, over an all-coaxial or a hybrid-fiber/coax (HFC) cable network 52. The transmission path includes a Cable Modem Termination System (CMTS) 50 at the headend, and a Cable Modem (CM) 56 at each customer location. The DOCSIS standard defines a single transmitter (i.e., CMTS 50) for each downstream channel and many receivers (i.e., CMs 56). All CMs 56 listen to all frames transmitted on the downstream channel upon which they are registered and accept those where the destinations match CM 56 itself or CPEs (Customer Premises Equipment) 58 connected to CM 56. CMs 56 communicate with other CMs 56 through the CMTS 50.

The upstream channel is characterized by many transmitters (i.e., CMs 56) and one receiver (i.e., CMTS 50). Time in the upstream channel is slotted, providing for time division multiple access (TDMA) at regulated time intervals. CMTS 50 provides the time reference and controls the allowed usage for each interval. Intervals may be granted for transmission by particular CMs 56, or for contention by all CMs 56. CMs 56 may contend to request transmission time. To a limited extent, CMs 56 may also contend to transmit actual data. In both cases, collisions can occur and retry techniques may be used.

The upstream Physical Media Dependent (PMD) sublayer uses a Frequency Division Multiple Access (FDMA)/TDMA burst modulation format that provides five symbol rates and two modulation formats (Quadrature Phase Shift Keying (QPSK) and 16-QAM (Quadrature Amplitude Modulation)). The PMD sublayer format includes a variable-length modulated burst with precise timing beginning at boundaries spaced at integer multiples of 6.25 microseconds apart (which is 16 symbols at the highest data rate). Each burst supports a flexible modulation, symbol rate, preamble, randomization of the payload, and programmable FEC (Forward Error Correction) encoding. All of the upstream transmission parameters associated with burst transmission outputs from CM 56 are configurable by CMTS 50 via Media Access Controller (MAC) messaging.

The concept of service flows is central to the operation of DOCSIS upstream transmissions. Service flows provide a mechanism for upstream Quality of Service (QoS) management. In particular, service flows play a part in bandwidth allocation. A service flow identifier (ID) defines a particular unidirectional mapping between a CM 56 and CMTS 50. Active upstream service flow IDs also have associated Service IDs or SIDs. CMTS 50 allocates upstream bandwidth to SIDs, and hence to CMs 56. SIDs provide the mechanism by which upstream QoS is implemented.

In a basic cable modem implementation, two service flows (one upstream, one downstream) could be used, for example, to offer best-effort IP service. However, the service flow concept allows for more complex cable modems to be developed that support multiple service classes while supporting interoperability with more basic modems. With these more complex cable modems, it is possible that certain service flows may be configured in such a way that they cannot carry all types of traffic. That is, service flows may have a maximum packet size limitation or be restricted to small, fixed size, unsolicited grants. Furthermore, it might not be appropriate to send other kinds of data on service flows that are being used for Constant Bit Rate (CBR)-type applications.

Even in these complex modems, it may be desirable to be able to send certain upstream packets needed for MAC management, SNMP management, key management, etc. For the network to function properly, all cable modems should support at least one upstream and one downstream service flow. All service flow IDs are unique within the upstream. The mapping of a unicast SID to an active/admitted service flow is unique within a single upstream. The length of the service flow ID is 32 bits. The length of the SID is 14 bits.

As shown in FIG. 2, the upstream transmission time-line is divided into intervals by the upstream bandwidth allocation mechanism. Each interval is an integral number of mini-slots. A "mini-slot" is the unit of granularity for upstream transmission opportunities. There is no implication that any packet data unit (PDU) can actually be transmitted in a single mini-slot. Each interval may be labeled with a usage code that defines both the type of traffic that can be transmitted during that interval and the physical-layer modulation encoding. A mini-slot is a power-of-two multiple of 6.25 microseconds increments (i.e., 2, 4, 8, 16, 32, 64, or 128 times 6.25 microseconds). Since the upstream channel is modeled as a stream of mini-slots, CMTS 50 generates the time reference for identifying these slots. CMTS 50 also controls access to these slots by CMs 56. For example, CMTS 50 may grant some number of contiguous slots to a CM 56 for it to transmit a data PDU. CM 56 times its transmission such that that CMTS 50 receives it in the time slot specified. A bandwidth allocation MAP is used for assigning bandwidth.

The bandwidth allocation MAP is a MAC Management message transmitted by CMTS 50 on the downstream channel that describes, for some interval of time, the uses to which the upstream frequency will be used by a given CM 56. A given MAP may describe some time slots as grants for particular CMs 56 to transmit data, other time slots as available for contention transmission, and other slots as an opportunity for new CMs 56 to join the link. FIG. 3 illustrates a MAC Header and MAC Management Message Header Fields.

The upstream bandwidth allocation MAP may include a fixed-length header followed by a variable number of information elements (IEs) as shown in FIG. 4. The upstream bandwidth allocation MAP message header may contain the following information:

Upstream Channel ID: The identifier of the upstream channel to which this message refers.

UCD Count: Matches the value of the Configuration Change Count of the Upstream Channel Descriptor (UCD) that describes the burst parameters that apply to this map.

Number of Elements: Number of IEs in the map.

Alloc Start Time: Effective start time from CMTS initialization (in mini-slots) for assignments within this map.

Ack Time: Latest time, from CMTS initialization, (mini-slots) processed in upstream. This time is used by the CMs for collision detection purposes.

Ranging Backoff Start: Initial back-off window for initial ranging contention, expressed as a power of two. Values range 0-15 (the highest order bits may be unused and set to 0).

Ranging Backoff End: Final back-off window for initial ranging contention, expressed as a power of two. Values range 0-15 (the highest order bits may be unused and set to 0).

The number of transmit opportunities associated with a particular IE in a MAP is dependent on the total size of the region as well as the allowable size of an individual transmission. As an example, assume a request (REQ) IE defines a region of 12 mini-slots. If the UCD defines a REQ Burst Size that fits into a single mini-slot, then there are 12 transmit opportunities associated with this REQ IE (i.e., one for each mini-slot). If the UCD defines a REQ that fits in two mini-slots, then there are six transmit opportunities and a REQ can start on every other mini-slot. Table 1 illustrates interval usage codes and their corresponding IE names.

TABLE 1

The Interval Usage Codes

| Interval Usage Code | Information Element Name |
|---|---|
| 1 | Request |
| 2 | REQ/Data |
| 3 | Initial Maintenance |
| 4 | Station Maintenance |
| 5 | Short Data Grant |
| 6 | Long Data Grant |
| 7 | Null IE |
| 8 | Data Acknowledge |
| 9-14 | Reserved |
| 15 | Expanded IUC |

As another example, assume a REQ/Data IE defines a 24 mini-slot region. If the REQ/Data IE is sent with a SID of 0x3FF4, then CM 56 can potentially start a transmit session on every fourth mini-slot. This IE contains a total of six transmit opportunities (TX OP). Similarly, a SID of 0x3FF6 implies four TX OPs; 0x3FF8 implies three TX OPs; and 0x3FFC implies two TX OPs.

For an Initial Maintenance IE, CM 56 starts its transmission in the first mini-slot of the region; therefore, CM 56 has a single transmit opportunity. The remainder of the region may be used to compensate for the round trip delays since CM 56 has not yet been ranged. Station Maintenance IEs, Short/Long Data Grant IEs, and unicast Request IEs are unicast and thus are not typically associated with contention transmit opportunities. They represent a single dedicated, or reservation based, transmit opportunity.

Each IE consists of a 14-bit SID, a 4-bit type code, and a 14-bit starting offset. FIG. 5 illustrates the structure of a MAP IE. Since all CMs 56 will scan all IEs, it is critical that IEs be short and relatively fixed format. IEs within the MAP are strictly ordered by starting offset. For most purposes, the duration described by the IE is inferred by the difference between the IE's starting offset and that of the following IE. For this reason, a Null IE terminates the list.

Types of Information Elements (IEs)

DOCSIS defines four types of SIDs:
1. 0x3FFF—broadcast, intended for all CMs.
2. 0x2000-0x3FFE—multicast, purpose is defined administratively.
3. 0x0001-0x1FFF—unicast, intended for a particular CM or a particular service within that CM.
4. 0x0000—null address, addressed to no CM.

All of the IEs defined are supported by CMs 56. CMTS 50 uses any of these IEs when creating Bandwidth Allocation MAPs.

The Request (REQ) IE

The Request IE provides an upstream interval in which requests can be made for bandwidth for upstream data transmission. The character of this IE changes depending on the class of SID. If broadcast, this is an invitation for all CMs 56 to contend for requests. If unicast, this is an invitation for a particular CM 56 to request bandwidth.

A small number of Priority Request SIDs is defined in DOCSIS. These allow contention for Request IEs to be limited to service flows of a given traffic priority. The Request/Data IE provides an upstream interval in which requests for bandwidth or short data packets may be transmitted. This IE is distinguished from the Request IE in that it provides a means by which allocation algorithms may provide for "immediate" data contention under light loads, and a means by which this opportunity can be withdrawn as network loading increases.

Multicast SIDs are used to specify maximum data length, as well as allowed random starting points within the interval. For example, a particular multicast SID may specify a maximum of 64-byte data packets, with transmit opportunities every fourth slot.

Short and Long Data Grant IEs

The Short and Long Data Grant IEs provide an opportunity for CM 56 to transmit one or more upstream PDUs. These IEs are issued either in response to a request from CM 56, or because of an administrative policy providing some amount of bandwidth to a particular CM 56 (see class-of-service discussion below). These IEs can also be used with an inferred length of zero mini slots (a zero length grant), to indicate that a request has been received and is pending (a Data Grant pending).

Short Data Grants are used with intervals less than or equal to the maximum burst size for this usage specified in the Upstream Channel Descriptor (UCD). If Short Data burst profiles are defined in the UCD, then all Long Data Grants are for a larger number of mini-slots than the maximum for Short Data. The distinction between Long and Short Data Grants may be exploited in physical-layer forward-error-correction coding; otherwise, it is not meaningful to the bandwidth allocation process.

If this IE is a Data Grant Pending (a zero length grant), it will follow the NULL IE. This allows CMs 56 to process all actual allocations first, before scanning the MAP for data grants pending and data acknowledgments.

Data Acknowledge IE

The Data Acknowledge IE acknowledges that a data PDU was received. CM 56 may request this acknowledgment within the data PDU (normally this would be done for PDUs transmitted within a contention interval in order to detect collisions). This IE will follow the NULL IE. This allows CMs 56 to process all actual interval allocations first, before scanning the MAP for data grants pending and data acknowledgments.

Requests

Requests refer to the mechanism that CMs 56 use to indicate to CMTS 50 that it needs upstream bandwidth allocation. A transmission request may come as a stand-alone Request Frame transmission or it may come as a piggyback request in the EHDR of another Frame transmission.

The Request Frame may be transmitted during any of the following intervals:

Request IE,
Request/Data IE,
Short Data Grant IE, and
Long Data Grant IE.

A piggyback request may be contained in the following Extended Headers (EHs):

Request EH element,
Upstream Privacy EH element, and
Upstream Privacy EH element with Fragmentation.

The request includes:

The SID making the request, and
The number of mini-slots requested.

The number of mini-slots requested may be the total number that is desired by CM 56 at the time of the request (including any physical layer overhead), subject to UCD 2 and administrative limits. CM 56 may request a number of mini-slots corresponding to one complete frame, except in the case of fragmentation in Piggyback Mode.

CM 56 may have one request outstanding at a time per SID. If CMTS 50 does not immediately respond with a Data Grant, CM 56 may unambiguously determine that its request is still pending because CMTS 50 will continue to issue a Data Grant Pending in every MAP for as long as a request is unsatisfied. In MAPs, CMTS 50 cannot make a data grant greater than 255 mini-slots to any assigned SID. This puts an upper bound on the grant size CM 56 has to support.

The allocation MAP transmitted in time to propagate across the physical cable may be received and handled by receiving CMs 56. As such, it may be transmitted considerably earlier than its effective time. The components of the delay are:

Worst-case round-trip propagation delay—may be network-specific, but on the order of hundreds of microseconds;
Queuing delays within the CMTS—implementation-specific;
Processing delays within the CMs will allow a minimum processing time by each CM; and
PMD-layer FEC interleaving.

Within these constraints, vendors may wish to minimize this delay so as to minimize latency of access to the upstream channel. The number of mini-slots described vary from MAP to MAP. At a minimum, a MAP describes a single mini-slot. This would be wasteful in both downstream bandwidth and in processing time within CMs 56. At maximum, a MAP may stretch to tens of milliseconds. Such a MAP would provide poor upstream latency, however.

Allocation algorithms vary the size of the MAPs over time to provide a balance of network utilization and latency under varying traffic loads. A MAP would contain at least two IEs: one to describe an interval and a null IE to terminate the list. At the most, a MAP is bounded by a limit of 240 IEs. MAPs are also bounded in that they will not describe more than 4096 mini-slots into the future. The latter limit is intended to bound the number of future mini-slots that each CM 56 is required to track. CM 56 is able to support multiple outstanding MAPs. Even though multiple MAPs may be outstanding, the sum of the number of mini-slots they describe may not exceed 4096. The set of all MAPs, taken together, describes every mini-slot in the upstream channel. If CM 56 fails to receive a MAP describing a particular interval, it will not transmit during that interval.

FIG. 6 illustrates a protocol exchange between CM 56 and CMTS 50. This example illustrates the interchange between CM 56 and CMTS 50 when CM 56 has data to transmit. If CM 56 has a data PDU available for transmission, then the following steps occur:

1. At time $t_1$, CMTS 50 transmits a MAP having an effective starting time of $t_3$. Within this MAP is a Request IE that starts at $t_5$. The difference between $t_1$ and $t_3$ is needed to allow for:

Downstream propagation delay (including FEC interleaving) to allow all CMs 56 to receive the MAP;
Processing time at the CM 56 (allows CMs 56 to parse the MAP and translate it into transmission opportunities); and
Upstream propagation delay (to allow the CM's transmission of the first upstream data to begin in time to arrive at CMTS 50 at time $t_3$).

2. At $t_2$, CM 56 receives this MAP and scans it for request opportunities. In order to minimize request collisions, CM 56 calculates $t_6$ as a random offset based on the Data Backoff Start value in the most recent MAP.

3. At $t_4$, CM 56 transmits a request for as many mini-slots as needed to accommodate the PDU. Time $t_4$ is chosen based on the ranging offset so that the request will arrive at CMTS 50 at $t_6$.

4. At $t_6$, CMTS 50 receives the request and schedules it for service in the next MAP. (The choice of which requests to grant will vary with the class of service requested, any competing requests, and the algorithm used by CMTS 50.)

5. At $t_7$, CMTS 50 transmits a MAP having an effective starting time of $t_9$. Within this MAP, a data grant for CM 56 will start at $t_{11}$.

6. At $t_8$, CM 56 receives the MAP and scans for its data grant.

7. At $t_{10}$, CM 56 transmits its data PDU so that it will arrive at CMTS 50 at $t_{11}$. Time $t_{10}$ is calculated from the ranging offset as in step 3 above.

Steps 1 and 2 need not contribute to access latency if CMs 56 routinely maintain a list of request opportunities. At step 3, the request may collide with requests from other CMs 56 and be lost. CMTS 50 may not directly detect the collision. CM 56 determines that a collision (or other reception failure) occurred when the next MAP fails to include acknowledgment of the request. CM 56 may then perform a back-off algorithm and retry.

At step 4, CMTS 50 scheduler may fail to accommodate the request within the next MAP. If so, CMTS 50 scheduler may reply with a zero-length grant in that MAP or discard the request by giving no grant at all. CMTS 50 scheduler may continue to report this zero-length grant in all succeeding MAPs until the request can be granted or is discarded. This will signal to CM 56 that the request is still pending. So long as CM 56 is receiving a zero-length grant, CM 56 will not issue new requests for that service queue.

Since many different scheduling algorithms can be implemented in CMTS 50, the DOCSIS specification does not mandate a particular scheduling algorithm. Instead, DOCSIS describes the protocol elements by which bandwidth is requested and granted. CMs 56 may issue requests to CMTS 50 for upstream bandwidth. CMTS 50 transmit allocation MAP PDUs on the downstream channel define the allowed usage of each mini-slot.

Contention Resolution

The DOCSIS specification mandates the method of contention resolution as the truncated binary exponential back-off, with the initial back-off window and the maximum back-off window controlled by CMTS 50. The values are specified as part of the Bandwidth Allocation MAP MAC message and represent a power-of-two value. For example, a value of 4 indicates a window between 0 and 15 while a value of 10 indicates a window between 0 and 1023.

When CM 56 has information to send and wants to enter the contention resolution process, CM 56 sets its internal back-off window equal to the Data Backoff Start defined in the MAP currently in effect. CM 56 may randomly select a number within its back-off window. This random value indicates the number of contention transmit opportunities which CM 56 will defer before transmitting. CM 56 may consider contention transmit opportunities for which this transmission would have been eligible. These are defined by either Request IEs or Request/Data IEs in the MAP. It will be appreciated that each IE can represent multiple transmission opportunities.

As an example, consider a CM 56 whose initial back-off window is 0 to 15. Assume that CM 56 randomly selects the number 11. CM 56 defers a total of 11 contention transmission opportunities. If the first available Request IE is for 6 requests, CM 56 does not use this and has 5 more opportunities to defer. If the next Request IE is for 2 requests, CM 56 has 3 more to defer. If the third Request IE is for 8 requests, CM 56 transmits on the fourth request, after deferring for 3 more opportunities.

After a contention transmission, CM 56 waits for a Data Grant (Data Grant Pending) or Data Acknowledge in a subsequent MAP. Once either is received, the contention resolution is complete. CM 56 determines that the contention transmission was lost when it finds a MAP without a Data Grant (Data Grant Pending) or Data Acknowledge for it and with an acknowledge time more recent than the time of transmission. CM 56 may increase its back-off window by a factor of two, as long as the new value is less than the maximum back-off window. CM 56 may randomly select a number within its new back-off window and repeat the deferring process described above.

This re-try process continues until the maximum number of retries (e.g., 16) has been reached, at which time the PDU will be discarded. The maximum number of retries is independent of the initial and maximum back-off windows that are defined by CMTS 50. If CM 56 receives a unicast Request or Data Grant at any time while deferring for this SID, CM 56 may stop the contention resolution process and use the explicit transmit opportunity.

CMTS 50 has much flexibility in controlling the contention resolution. At one extreme, CMTS 50 may choose to set up the Data Backoff Start and End to emulate an Ethernet-style back-off with its associated simplicity and distributed nature, but also its fairness and efficiency issues. This would be done by setting Data Backoff Start=0 and End=10 in the MAP. At the other end, CMTS 50 may make the Data Backoff Start and End identical and frequently update these values in the MAP so all CMs 56 are using the same, and hopefully optimal, back-off window.

CM Bandwidth Utilization

The following rules govern the response CM 56 makes when processing MAPs. These standard behaviors can be overridden by the CM's Request/Transmission Policy.

1. CM 56 may first use any Grants assigned to it. Next, CM 56 may use any unicast REQ for it. Finally, CM 56 may use the next available broadcast/multicast REQ or REQ/Data IEs for which it is eligible.

2. CM 56 may not have more than one Request outstanding at a time for a particular SID.

3. If CM 56 has a Request pending, it will not use intervening contention intervals for that SID.

DOCSIS CMTS Scheduling

DOCSIS scheduling services are designed to improve the efficiency of the poll/grant process. By specifying a scheduling service and its associated QoS parameters, the DOCSIS CMTS 50 can anticipate the throughput and latency needs of the upstream traffic and provide polls and/or grants at the appropriate times.

Each service is tailored to a specific type of data flow as described below. The basic services include:
Unsolicited Grant Service (UGS),
Real-Time Polling Service (rtPS),
Unsolicited Grant Service with Activity Detection (UGS-AD),
Non-Real-Time Polling Service (nrtPS), and
Best Effort (BE) service.

FIG. 7 illustrates the relationship between the scheduling services and the related QoS parameters. Each is described in more detail below.

Unsolicited Grant Service

The Unsolicited Grant Service (UGS) is designed to support real-time service flows that generate fixed size data packets on a periodic basis, such as Voice over IP (VoIP). The UGS service offers fixed size grants on a real-time periodic basis, which eliminates the overhead and latency of CM 56 requests and assure that grants will be available to meet the flow's real-time needs.

CMTS 50 provides fixed size data grants at periodic intervals to the service flow. In order for this service to work correctly, the Request/Transmission Policy setting should be such that CM 56 is prohibited from using any contention request or request/data opportunities and CMTS 50 does not provide any unicast request opportunities. The Request/Transmission Policy also prohibits piggyback requests. This will result in CM 56 only using unsolicited data grants for upstream transmissions. The key service parameters are the Unsolicited Grant Size, the Nominal Grant interval, the Tolerated Grant Jitter and the Request/Transmission Policy.

ATM Constant Bit Rate (CBR) Services

The CBR service class is intended for real-time applications (i.e., those requiring tightly constrained delay and delay variation), as would be appropriate for voice and video applications. The consistent availability of a fixed quantity of bandwidth is considered appropriate for CBR service. Cells that are delayed beyond the value specified by Cell Transfer Delay (CTD) are assumed to be significantly less value to the application.

For CBR, the following ATM attributes are specified:
PCR/CDVT(peak cell rate/cell delay variation tolerance),
Cell Loss Rate (CLR),
CTD/CDV, and
CLR may be unspecified for CLP equal to 1.

Real-Time Polling Service

The Real-Time Polling Service (rtPS) is designed to support real-time service flows that generate variable size data packets on a periodic basis, such as MPEG video. rtPS offers real-time, periodic, unicast request opportunities, that meet the flow's real-time needs and allow CM 56 to specify the size of the desired grant. rtPS requires more request overhead than UGS, but supports variable grant sizes for optimum data transport efficiency.

CMTS 50 may provide periodic unicast request opportunities. In order for this service to work correctly, the Request/Transmission Policy setting should be such that CM 56 is prohibited from using any contention request or request/data opportunities. The Request/Transmission Policy should also prohibit piggyback requests. CMTS 50 may issue unicast request opportunities as prescribed by this service even if a grant is pending. This will result in CM 56 using only unicast request opportunities in order to obtain upstream transmission opportunities (CM 56 could still use unsolicited data grants for upstream transmissions as well). All other bits of the Request/Transmission Policy are not relevant to the fundamental operation of this scheduling service and should be set according to network policy. The key service parameters are the Nominal Polling Interval, the Tolerated Poll Jitter and the Request/Transmission Policy.

ATM Real Time VBR

The real time VBR service class is intended for real-time applications (i.e., those requiring tightly constrained delay and delay variation), as would be appropriate for voice and video applications. Sources are expected to transmit at a rate that varies with time. As a result, the source can be described as "bursty." Cells that are delayed beyond the value specified by CTD are assumed to be of significantly less value to the application. Real-time VBR service may support statistical multiplexing of real-time sources, or may provide a consistently guaranteed QoS.

For real time VBR, the following ATM attributes are specified:

PCR/CDVT,
CLR,
CTD/CDV, and
SCR and BT (sustainable cell rate and burst tolerance).

Unsolicited Grant Service with Activity Detection

The Unsolicited Grant Service with Activity Detection (UGS/AD) is designed to support UGS flows that may become inactive for substantial portions of time (e.g., tens of milliseconds or more), such as VoIP with silence suppression. The service provides Unsolicited Grants when the flow is active and unicast polls when the flow is inactive. This combines the low overhead and low latency of UGS with the efficiency of rtPS. Though USG/AD combines UGS and rtPS, only one scheduling service is active at a time.

CMTS 50 may provide periodic unicast grants, when the flow is active, but may revert to providing periodic unicast request opportunities when the flow is inactive. CMTS 50 can detect flow inactivity by detecting unused grants. However, the algorithm for detecting a flow changing from an active to an inactive state is dependent on CMTS 50 implementation. In order for this service to work correctly, the Request/Transmission Policy setting should be such that CM 56 is prohibited from using any contention request or request/data opportunities. The Request/Transmission Policy should also prohibit piggyback requests. This results in CM 56 using only unicast request opportunities in order to obtain upstream transmission opportunities. However, CM 56 may use unsolicited data grants for upstream transmissions as well.

All other bits of the Request/Transmission Policy are not relevant to the fundamental operation of this scheduling service and should be set according to network policy. The key service parameters are the Nominal Polling Interval, the Tolerated Poll Jitter, the Nominal Grant Interval, the Tolerated Grant Jitter, the Unsolicited Grant Size, and the Request/Transmission Policy.

In UGS-AD service, when restarting UGS after an interval of rtPS, CMTS 50 may provide additional grants in the first (and/or second) grant interval such that CM 56 receives a total of one grant for each grant interval from the time CM 56 requested restart of UGS, plus one additional grant. Because the service flow is provisioned as a UGS flow with a specific grant interval and grant size, when restarting UGS, CM 56 may not request a different sized grant than the already provisioned UGS flow. As with any service flow, changes may be requested with a DSC command. If the restarted activity requires more than one grant per interval, CM 56 may indicate this in the Active Grants field of the UGSH beginning with the first packet sent.

The Service Flow Extended Header Element allows CM 56 to dynamically state how many grants per interval are required to support the number of flows with activity present. In UGS/AD, CM 56 may use the Queue Indicator Bit in the UGSH. The remaining seven bits of the UGSH define the Active Grants field. This field defines the number of grants within a Nominal Grant Interval that this service flow currently requires.

When using UGS/AD, CM 56 may indicate the number of requested grants per Nominal Grant Interval in this field. The Active Grants field of the UGSH may be ignored with UGS without Activity Detection. This field allows CM 56 to signal to CMTS 50 to dynamically adjust the number of grants per interval that this UGS Service Flow is actually using. CM 56 may not request more than the number of Grants per Interval in the ActiveQoSParameterSet.

If CMTS 50 allocates additional bandwidth in response to the QI bit, CMTS 50 will use the same rate limiting formula as UGS, but the formula only applies to steady state periods where CMTS 50 has adjusted the grants per interval to match the active grants requested by CM 56.

When CM 56 receives unsolicited grants and detects no activity on the service flow, CM 56 may send one packet with the Active Grants field set to zero grants and then cease transmission. Because this packet may not be received by CMTS 50, when the service flow goes from inactive to active, CM 56 may be able to restart transmission with either polled requests or unsolicited grants.

Non-Real-Time Polling Service

The Non-Real-Time Polling Service (nrtPS) is designed to support non real-time service flows that require variable size data grants on a regular basis, such as high bandwidth FTP. nrtPS offers unicast polls on a regular basis, which assures that the flow receives request opportunities even during network congestion. CMTS 50 typically polls nrtPS SIDs on periodic or non-periodic intervals on the order of one second or less.

CMTS 50 provides timely unicast request opportunities. In order for this service to work correctly, the Request/Transmission Policy setting should be such that CM 56 is allowed to use contention request opportunities. This results in CM 56 using contention request opportunities, as well as unicast request opportunities and unsolicited data grants. All other bits of the Request/Transmission Policy are not relevant to the fundamental operation of this scheduling service and should be set according to network policy. The key service parameters are Nominal Polling Interval, Minimum Reserved Traffic Rate, Maximum Sustained Traffic Rate, Request/Transmission Policy, and Traffic Priority.

ATM Non-Real Time VBR

The non-real time VBR service class is intended for non-real time applications that have "bursty" traffic characteristics and can be characterized in terms of a GCRA. For those cells that are transferred, it expects a bound on the cell transfer delay. Non-real time VBR service supports statistical multiplexing of connections.

For non-real time VBR, the following ATM attributes are specified:

PCR/CDVT,

CLR,

CTD, and

SCR and BT.

Best Effort Service

The intent of the Best Effort (BE) service is to provide efficient service to best effort traffic. In order for this service to work correctly, the Request/Transmission Policy setting should be such that CM 56 is allowed to use contention request opportunities. This results in CM 56 using contention request opportunities, as well as unicast request opportunities and unsolicited data grants. All other bits of the Request/Transmission Policy are not relevant to the fundamental operation of this scheduling service and should be set according to network policy. The key service parameters are the Minimum Reserved Traffic Rate, the Maximum Sustained Traffic Rate, and the Traffic Priority.

ATM UBR (Unspecified Bit Rate)

The UBR service class is intended for delay-tolerant or non-real-time applications (i.e., those that do not require tightly constrained delay and delay variation), such as traditional computer communications applications. Sources are expected to transmit non-continuous bursts of cells. UBR service supports a high degree of statistical multiplexing among sources. UBR service includes no notion of a per-VC allocated bandwidth resource. Transport of cells in UBR service is not necessarily guaranteed by mechanisms operating at the cell level. However, it is expected that resources will be provisioned for UBR service in such a way as to make it usable for some set of applications. UBR service may be considered as interpretation of the common term "best effort service."

For UBR, the following ATM attribute is specified:

PCR/CDVT.

ATM ABR (Available Bit Rate)

Many applications have the ability to reduce their information transfer rate if the network requires them to do so. Likewise, they may wish to increase their information transfer rate if there is extra bandwidth available within the network. There may not be deterministic parameters because the users are willing to live with unreserved bandwidth. To support traffic from such sources in an ATM network may require facilities different from those for Peak Cell Rate of Sustainable Cell Rate traffic. The ABR service is designed to fill this need.

Relevant Encodings for the Upstream Scheduling

Service Flow Scheduling Type

The value of this parameter specifies which upstream scheduling service is used for upstream transmission requests and packet transmissions. If this parameter is omitted, then the Best Effort service is generally assumed. This parameter is applicable at CMTS 50. If defined, this parameter is enforced by CMTS 50.

| Type | Length | Value |
|---|---|---|
| 24.15 | 1 | 0 Reserved |
| | | 1 for Undefined (CMTS implementation-dependent 1) |
| | | 2 for Best Effort |
| | | 3 for Non-Real-Time Polling Service |
| | | 4 for Real-Time Polling Service |
| | | 5 for Unsolicited Grant Service with Activity Detection |
| | | 6 for Unsolicited Grant Service |
| | | 7 through 255 are reserved for future use |

Request/Transmission Policy

The value of this parameter specifies 1) which IUC opportunities CM 56 uses for upstream transmission requests and packet transmissions for this service flow, 2) whether requests for this service flow may be piggybacked with data, and 3) whether data packets transmitted on this service flow can be concatenated, fragmented, or have their payload headers suppressed. For UGS, it also specifies how to treat packets that do not fit into the UGS grant. The data grants may include both short and long data grants.

Bit #0—The service flow will not use "all CMs" broadcast request opportunities.

Bit #1—The service flow will not use Priority Request multicast request opportunities.

Bit #2—The service flow will not use Request/Data opportunities for Requests.

Bit #3—The service flow will not use Request/Data opportunities for Data.

Bit #4—The service flow will not piggyback requests with data.

Bit #5—The service flow will not concatenate data.

Bit #6—The service flow will not fragment data.

Bit #7—The service flow will not suppress payload headers.

Bit #8—The service flow will drop packets that do not fit in the Unsolicited Grant Size.

Priority Request Service IDs

These SIDs (0x3Exx) are reserved for Request IEs:

If 0x01 bit is set, priority zero can request.

If 0x02 bit is set, priority one can request.

If 0x04 bit is set, priority two can request.

If 0x08 bit is set, priority three can request.

If 0x10 bit is set, priority four can request.

If 0x20 bit is set, priority five can request.

If 0x40 bit is set, priority six can request.

If 0x80 bit is set, priority seven can request.

Bits can be combined as desired by the CMTS upstream scheduler for any Request IUCs.

Traffic Priority

The value of this parameter specifies the priority assigned to a service flow. Given two service flows identical in all QoS parameters besides priority, the higher priority service flow should be given lower delay and higher buffering preference. For otherwise non-identical service flows, the priority parameter will not take precedence over any conflicting service flow QoS parameter. The specific algorithm for enforcing this parameter is not mandated here.

For upstream service flows, CMTS 50 should use this parameter when determining precedence in request service and grant generation, and CM 56 may preferentially select contention Request opportunities for Priority Request SIDs based on this priority and its Request/Transmission Policy.

To illustrate the problem current CMTS scheduling under DOCSIS presents, an example application known commonly in the industry as "PacketCable" is described below. Packet-Cable is a project conducted by Cable Television Laboratories, Inc. and its member companies. The PacketCable project is aimed at defining interface specifications that can be used to develop interoperable equipment capable of providing packet-based voice, video, and other high-speed multimedia services over hybrid-fiber/coax (HFC) cable systems utilizing the DOCSIS protocol. PacketCable utilizes a network superstructure that overlays the two-way data-ready broadband cable access network. While the initial PacketCable offering will be packet-based voice communications for existing and new cable subscribers, the long-term project vision encompasses a large suite of packet-based capabilities.

The application of NCS PacketCable call setup will be used throughout when discussing the various embodiments of the invention. The example uses the PacketCable NCS call protocol along with the DQoS setup procedure. The PacketCable NCS protocol requires a large number of messages passed between the eMTA (embedded multimedia terminal adapter: a device that includes both the VoIP functionality and the CM functionality). The messages passed in their protocol flow are shown in FIGS. 8-10.

There are three alternatives to the PacketCable NCS call setup using strict DOCSIS mechanisms. The first one is the simplest one and puts the call signaling messaging in the request/contention area. The second one uses the polled requests for the NCS call signaling. The last one uses priority requests. Each of these is described in turn.

Using Broadcast Request Opportunities

In the method that uses broadcast request opportunities, the NCS call signaling uses the best effort scheduling type. Two problems may exist in the areas of transmission: the first one is the delay in transmitting packets from the eMTA, and the second one relates to the sharing of bandwidth between requests/contentions and data transmissions.

The first issue is that assuming there is no contention on CM 56 requests, a delay occurs in transmitting the packet. FIGS. 11-13 show the messages that are exchanged between the eMTA and the CMTS for transmission of the call signaling packets when using broadcast request opportunities. Referring to FIGS. 11-13, it can be shown that there are 4 packets that have to be sent upstream before the phone rings on the originator and 3 packets that have to be sent out on the far-end. This is assuming that the dial map is designed in such a way that the first time the eMTA contacts the CMTS is the time that all the digits are completed.

To further analyze, certain designs of a CMTS issue MAP messages every 4 milliseconds. Thus using that metric, on average, packets wait in the queue of the CMTS for 2 milliseconds to make the request. Further, it takes 1 millisecond for the message to propagate to the CMTS. Also, assume that the request can be granted in the first MAP message and on average the packet would be scheduled from the arrival of MAP within 2 milliseconds. It takes 2 milliseconds for the MAP packet to be received from the CMTS to the CM.

The result is shown in Table 2 below:

TABLE 2

| Explanation | Delay | Total Delay |
|---|---|---|
| The request is send in the contention area | 2 ms | 2 ms |
| Interleaving delay | 3 ms | 5 ms |
| Upstream Propagation delay | 1 ms | 6 ms |
| The CMTS processes the request and schedules | 1 ms | 7 ms |
| Downstream propagation delay | 1 ms | 8 ms |
| The data area is used | 2 ms | 10 ms |
| Interleaving delay | 3 ms | 13 ms |
| The data is received by the CMTS | 1 ms | 14 ms |

It should be noted that these numbers assume that the CMTS processing is in such a way that the data grant is issued with the next MAP message. A more realistic number is 15 millisecond average delay between the call signaling packet interception at the CM to the packet arriving at the CMTS for further processing.

The contribution of cable transmission delay to post dial delay may be calculated for the originating side as:

4 upstream messages*15 ms per message delay=60 ms delay.

For the far-end the result is:

3 upstream messages*15 ms per message delay=45 ms delay.

Therefore, the cable segment transmission consumes 10% of the end-to-end delay budget of less than one second of post dial delay.

For the second issue, it has been shown that the sharing of request/contention areas with data transmissions introduces a very big delay to the system that may not be acceptable during congestion intervals. It is possible that such is not applicable to a modern scheduler that schedules the number of contention/requests to the traffic usage pattern. But, the issue still remains since the use of request/contention area cannot be prioritized between SIDs that are on different CMs, meaning that it is not possible for the CMTS to give call signaling packets preferential treatment. Since the cable transmission delay cannot be guaranteed, this would be reason enough for the request/contention area not to be used. The second alternative is the use of the non-real time polling.

Using Polled Request Opportunities

The polled request opportunity method assumes that all of the NCS call signaling packets are sent through the service flows that are using the non-real-time polled scheduling type as defined by DOCSIS. In the non-real time polling, the CM can use the request/contention grants but the CMTS is responsible for providing timely unicast request opportunities. The problem with this kind of scheduling is that since the CMTS cannot guess which CMs are in contention in a contention/request opportunity, when a contention is detected, the CM should revert to the Unicast Polling Opportunities, which makes use of the request/contention opportunities difficult during high traffic.

Due to the reasons whether the non-real-time polling or the real-time polling is to be used in such kind of a situation, the service flow should not use broadcast request opportunities. For the real-time polling, the CMTS may generate a request opportunity for each service flow individually. The CMTS may, for example, give a unicast request opportunity to each one of the 1000 CMs. Assume that a unicast request takes 12 bytes, which, for the best case of transmission, takes 12.5 microseconds of upstream time. For all CMs, this yields an upstream time of 12.5 microseconds*1000 (i.e., 12.5 milliseconds).

Assuming the presence of maintenance and other overhead information, the minimum interval for the CM polling may not exceed 7 millisecond intervals. It is important to note that in such a case, the whole upstream bandwidth is being used for polling and the upstream bandwidth cannot be used for other data transmission. It is important to consider, however, that the main idea is to be able to use the upstream for the transport of VoIP and other data transmissions as well.

Using Priority Request Opportunities

The last method is to use the priority request SIDs for the NCS call signaling packets. In this method, all of the NCS call signaling packets use the service flows that have the request transmission policy set to indicate that CM will not use the broadcast request opportunities and the CM will use the priority request multicast opportunities.

Even though the DOCSIS specification defines these fields as strict ordering for lower delay and higher buffering, it is possible to use the priority for grouping the service flows for NCS call signaling. If it is assumed that all the remaining flows with best effort scheduling type are using the priority zero and the NCS call signaling is using priority 5, then the CMTS schedules with every MAP cycle a priority 5 request opportunity (using SID x3E20).

In such a case, the NCS data packets using the priority 0 will be using the broadcast request opportunities and the priority 5 request opportunity will be used by the NCS call signaling. The benefit of such a scheme is that there is no waste of bandwidth due to individual poll and at the same time the NCS call signaling packets will not be contending with the NCS data packets.

The only issue with such a method is that the CM will use the truncated binary exponential backoff algorithm to pick the opportunity it will utilize, and there is only one global data backoff start setting and one data backoff end setting. If a CM uses the same values that are being used for the broadcast data opportunities or any of the other contention request opportunities, then this would cause an unnecessary bandwidth waste. One solution may be to use the segmented backoff setting bandwidth allocation MAP messages generation in the CMTS scheduler.

The problem with using Priority Requests is as follows. Assume that the priority 5 is being used for the NCS call signaling and the data backoff setting of a start value of 0 and an end value of 3 is sufficient for the expected contention probability. It can be further assumed that the broadcast request opportunities use the start value of 2 and an end value of 7. Table 3 below contains the number of mini-slots in one 4 millisecond interval for various symbol rates/modulations.

TABLE 3

| | mini-slot size (ticks) | | | | | | |
|---|---|---|---|---|---|---|---|
| | 2 | 4 | 8 | 16 | 32 | 64 | 128 |
| | mini-slot size (us) | | | | | | |
| | 12.5 | 25 | 50 | 100 | 200 | 400 | 800 |
| symbol rate | number of mini-slots in 4 ms interval | | | | | | |
| 160000 | N/A | N/A | N/A | N/A | 20 | 10 | 5 |
| 320000 | N/A | N/A | N/A | 40 | 20 | 10 | 5 |
| 640000 | N/A | N/A | 80 | 40 | 20 | 10 | 5 |
| 1280000 | N/A | 160 | 80 | 40 | 20 | 10 | 5 |
| 25600000 | 320 | 160 | 80 | 40 | 20 | 10 | 5 |
| 160000 | N/A | N/A | N/A | N/A | 20 | 10 | 5 |
| 320000 | N/A | N/A | N/A | 40 | 20 | 10 | 5 |
| 640000 | N/A | N/A | 80 | 40 | 20 | 10 | 5 |
| 1280000 | N/A | 160 | 80 | 40 | 20 | 10 | 5 |
| 25600000 | 320 | 160 | 80 | 40 | 20 | 10 | 5 |

Assuming that a request takes 2 mini-slots, the number of request opportunities on a 4 millisecond interval is shown in Table 4.

TABLE 4

| | mini-slot size (ticks) | | | | | | |
|---|---|---|---|---|---|---|---|
| | 2 | 4 | 8 | 16 | 32 | 64 | 128 |
| | mini-slot size (us) | | | | | | |
| | 12.5 | 25 | 50 | 100 | 200 | 400 | 800 |
| symbol rate | number of requests in 4 ms interval | | | | | | |
| 16000 | N/A | N/A | N/A | N/A | 10 | 5 | 2.5 |
| 32000 | N/A | N/A | N/A | 20 | 10 | 5 | 2.5 |
| 64000 | N/A | N/A | 40 | 20 | 10 | 5 | 2.5 |
| 128000 | N/A | 80 | 40 | 20 | 10 | 5 | 2.5 |
| 2560000 | 160 | 80 | 40 | 20 | 10 | 5 | 2.5 |
| 16000 | N/A | N/A | N/A | N/A | 10 | 5 | 2.5 |
| 32000 | N/A | N/A | N/A | 20 | 10 | 5 | 2.5 |
| 64000 | N/A | N/A | 40 | 20 | 10 | 5 | 2.5 |
| 128000 | N/A | 80 | 40 | 20 | 10 | 5 | 2.5 |
| 2560000 | 160 | 80 | 40 | 20 | 10 | 5 | 2.5 |

Assuming that all the priority request types are being used, then 8 requests per MAP are possible. The difference between using the broadcast request data backoff settings and a specific value for the priority request is: 8 priority values*3 unnecessary requests per MAP interval=24 unnecessary requests.

Due to the fact that the main reason for the use of priority requests is the timely transport of packets, it is assumed that at least the initial data backoff setting of priority request opportunities has to be given in each interval. If there are at least 4 requests per MAP interval, the wasted interval can be calculated as shown in Table 5.

TABLE 5

| | mini-slot size (ticks) | | |
|---|---|---|---|
| | 2 | 4 | 8 |
| | mini-slot size (us) | | |
| | 12.5 | 25 | 50 |
| Symbol rate | number of requests in 4 ms interval | | |
| 160000 | N/A | N/A | N/A |
| 320000 | N/A | N/A | N/A |
| 640000 | N/A | N/A | 0.666667 |
| 1280000 | N/A | 0.315789 | 0.666667 |
| 25600000 | 0.153846 | 0.315789 | 0.666667 |
| 160000 | N/A | N/A | N/A |
| 320000 | N/A | N/A | N/A |
| 640000 | N/A | N/A | 0.666667 |
| 1280000 | N/A | 0.315789 | 0.666667 |
| 25600000 | 0.153846 | 0.315789 | 0.666667 |

This implies that a minimum of 15% of the upstream mini-slots will be wasted due to inability of the scheduler to send bandwidth allocation MAP messages with different data backoff settings.

A challenging aspect of DOCSIS CMTS design are problems with scheduling channels and service flows generated therein based upon applications that use the bandwidth provided to them by the CM system. Today, the general analysis of the DOCSIS upstream scheduling is carried out in the domain of scheduling the data transmission opportunities. The request for upstream transmission is assumed to arrive at the CMTS timely, and a uniform delay distribution is generally assumed for request arrival. For instance, the typical CM may have no idea if the application requesting a service flow is an HTTP application or a VoIP. The main challenge for the CMTS is to identify the particular application that is requesting the service flow so that the CMTS can meet the delay, bandwidth and other requirements of service flow quality of service encodings by scheduling the data transmission opportunities.

Therefore, there exists a need for systems and methods that identify applications requesting service flows.

SUMMARY OF THE INVENTION

Systems and methods consistent with the present invention address this and other needs by providing techniques for identifying applications in a cable modem communications network.

In accordance with the purpose of this invention as embodied and broadly described herein, a method for allocating resources in a network is disclosed. The method includes receiving an allocation request for a first flow and a second flow from an application, identifying the application based on the allocation request, and scheduling resources based on the identifying and the second flow.

In another implementation consistent with the present invention, a network device is disclosed. The network device includes logic that receives a request for a first flow and a second flow from an application, logic that characterizes the application based on the request, and logic that schedules resources for the first flow based on the characterization of the application and the second flow.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 illustrates the relationship between the scheduling services and the related QoS parameters;

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the present invention provide techniques for identifying applications requesting service flows in a cable modem communications network. By identifying the applications, the CMTS can determine the QoS parameters to associate with the applications, and thus, the amount of resources to be scheduled for the applications.

Exemplary System

Figure 1:
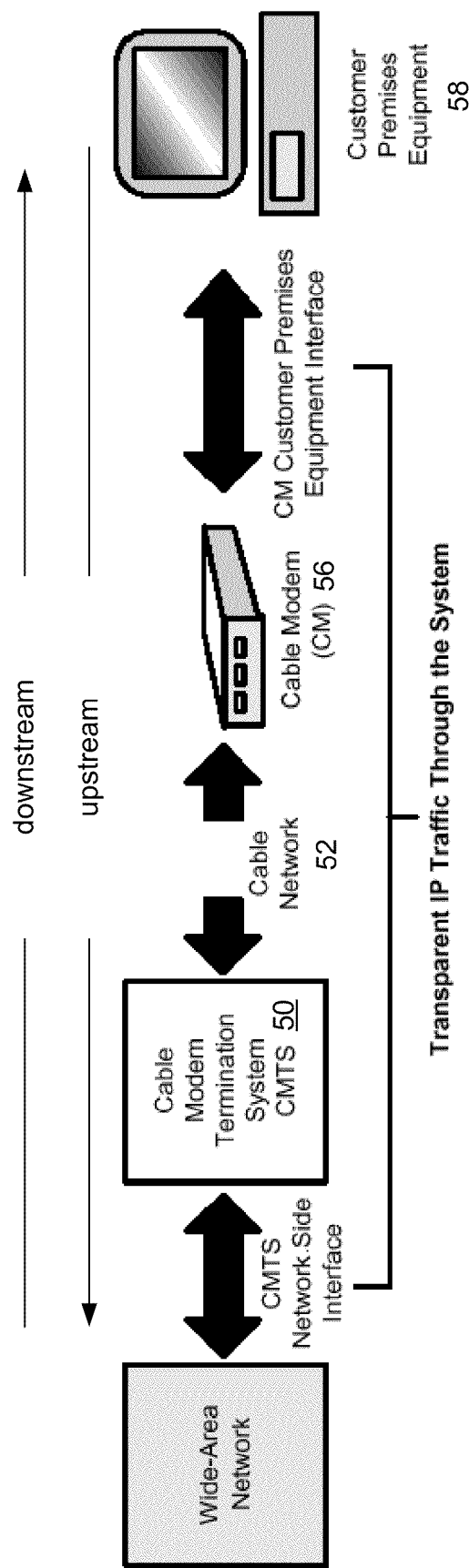
FIG. 1 illustrates a simplified diagram of a conventional cable modem system.
Figure 2:
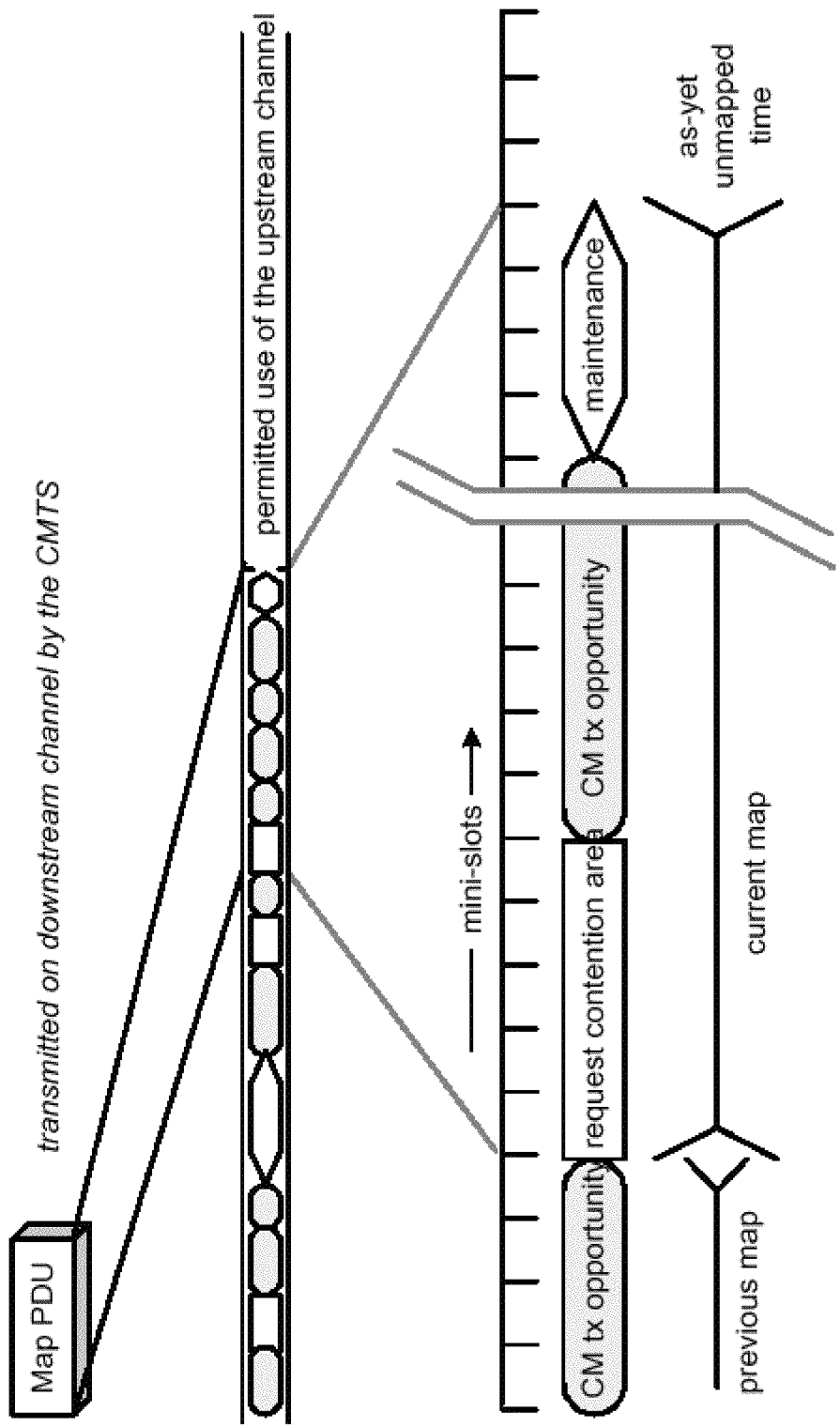
FIG. 2 illustrates the upstream transmission time-line being divided into intervals by the upstream bandwidth allocation mechanism.
Figure 3:
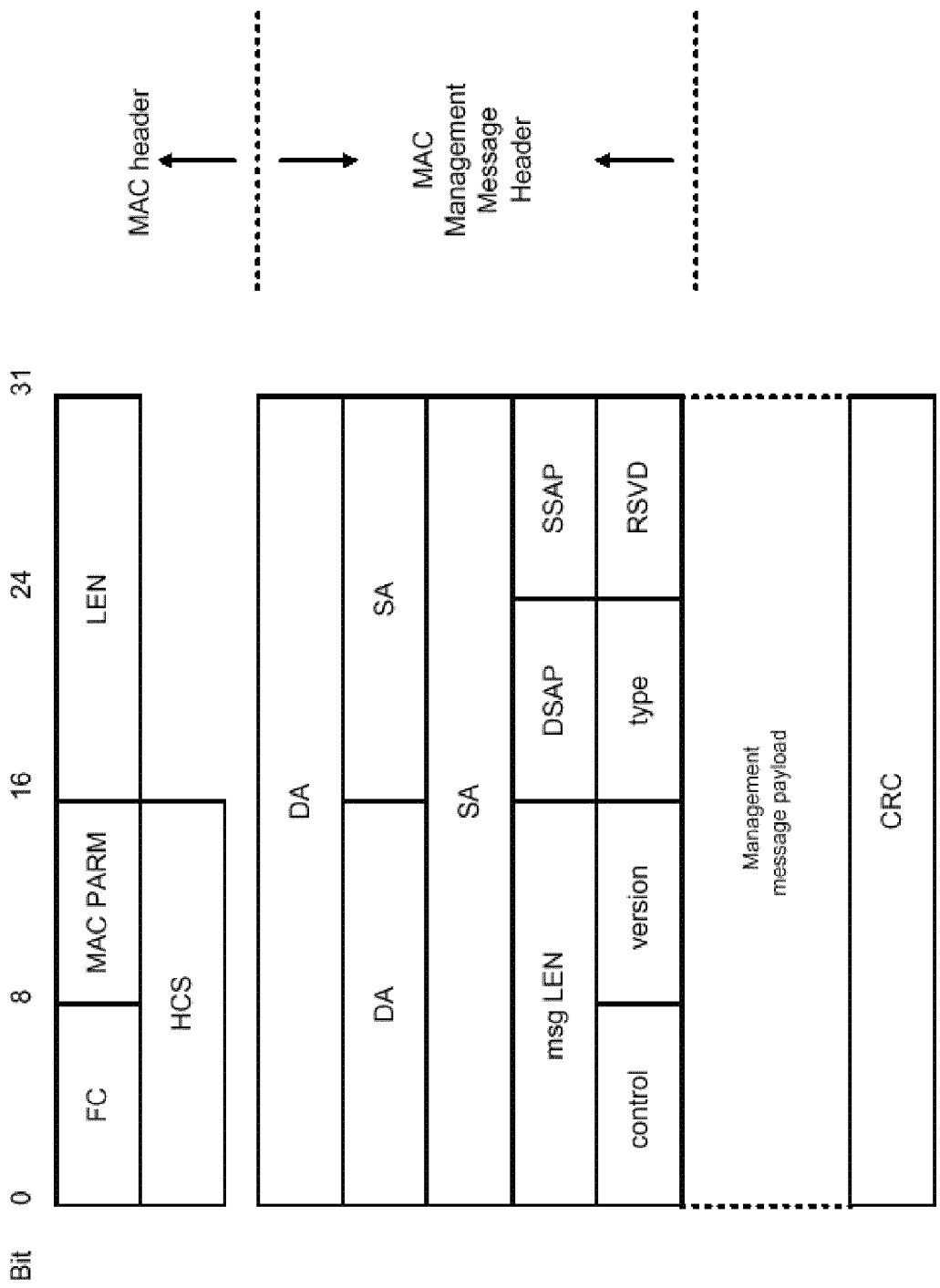
FIG. 3 illustrates a MAC Header and MAC Management Message Header fields.
Figure 4:
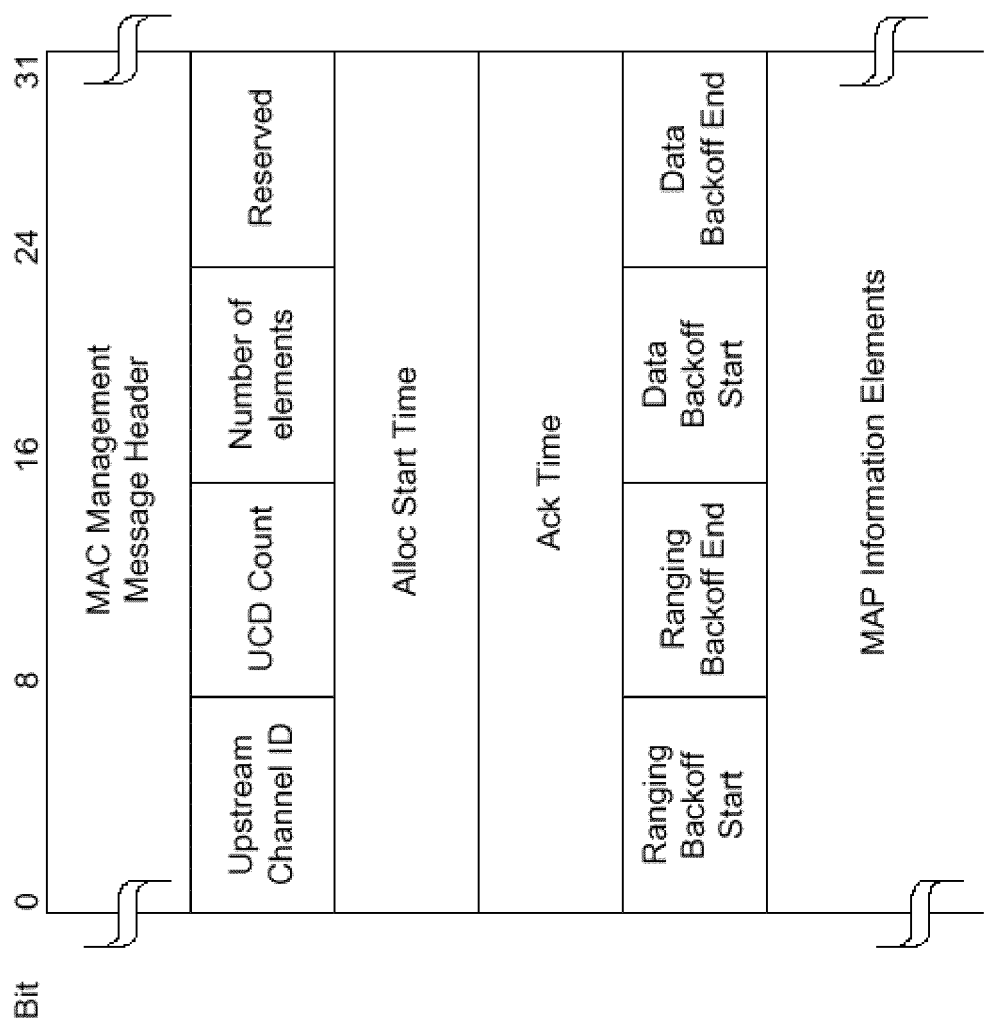
FIG. 4 illustrates the components of an upstream bandwidth allocation MAP including a variable number of IEs.
Figure 5:
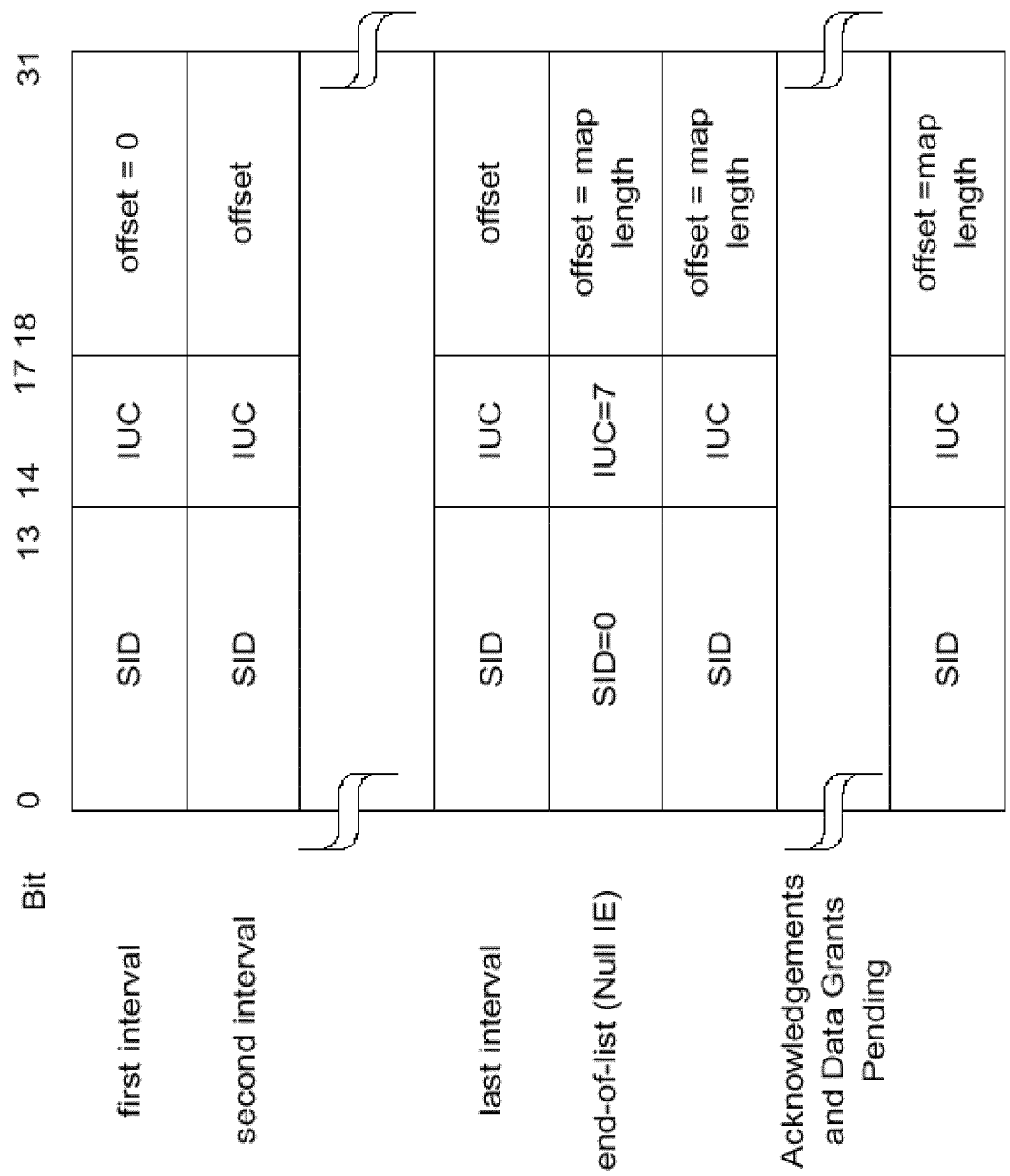
FIG. 5 illustrates the structure of a MAP IE.
Figure 6:
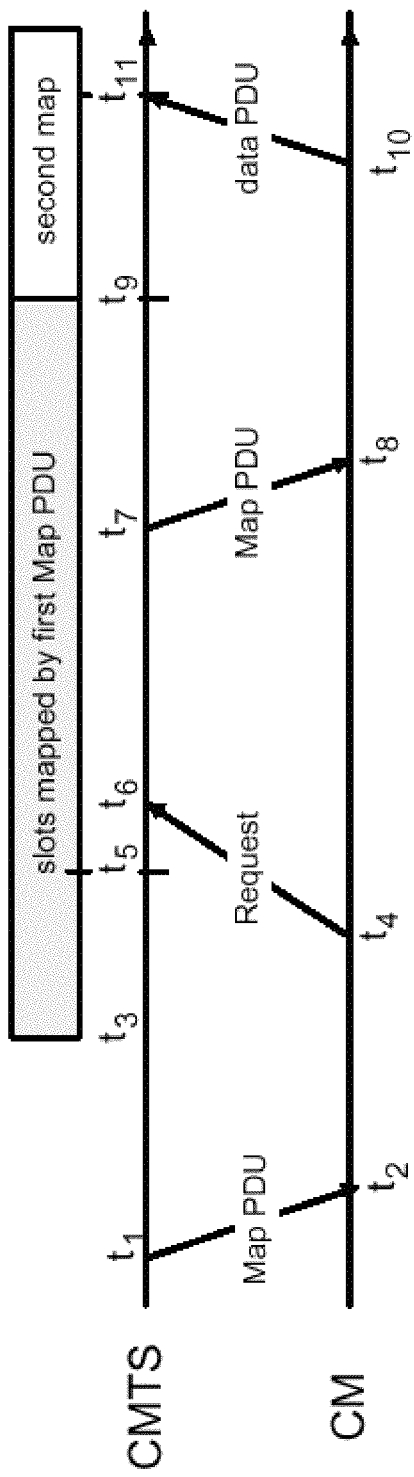
FIG. 6 illustrates a protocol exchange between a CM and a CMTS.
Figure 8:
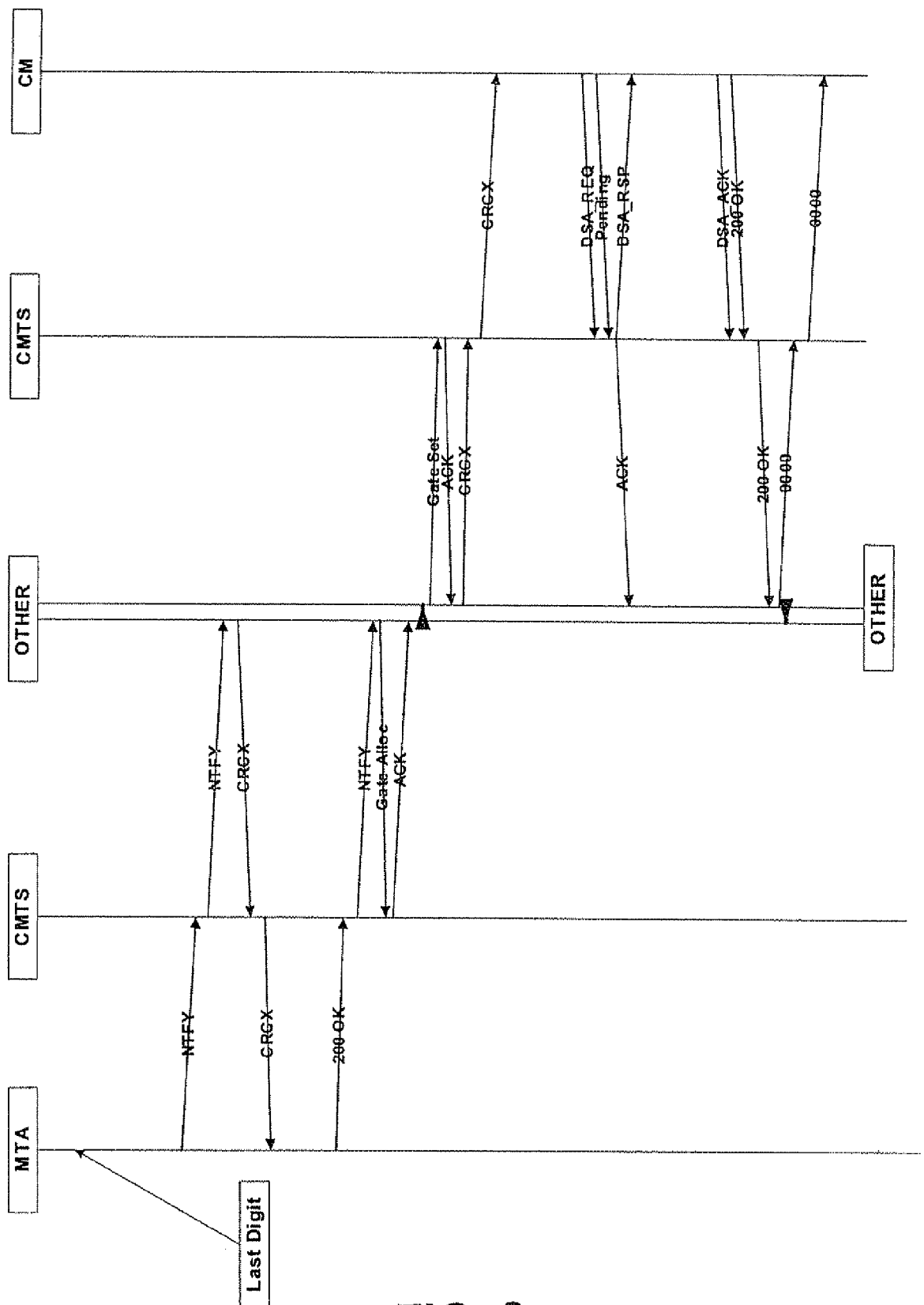
FIG. 8 illustrates a first portion of all of the messages passed in a NCS PacketCable call setup protocol flow.
Figure 9:
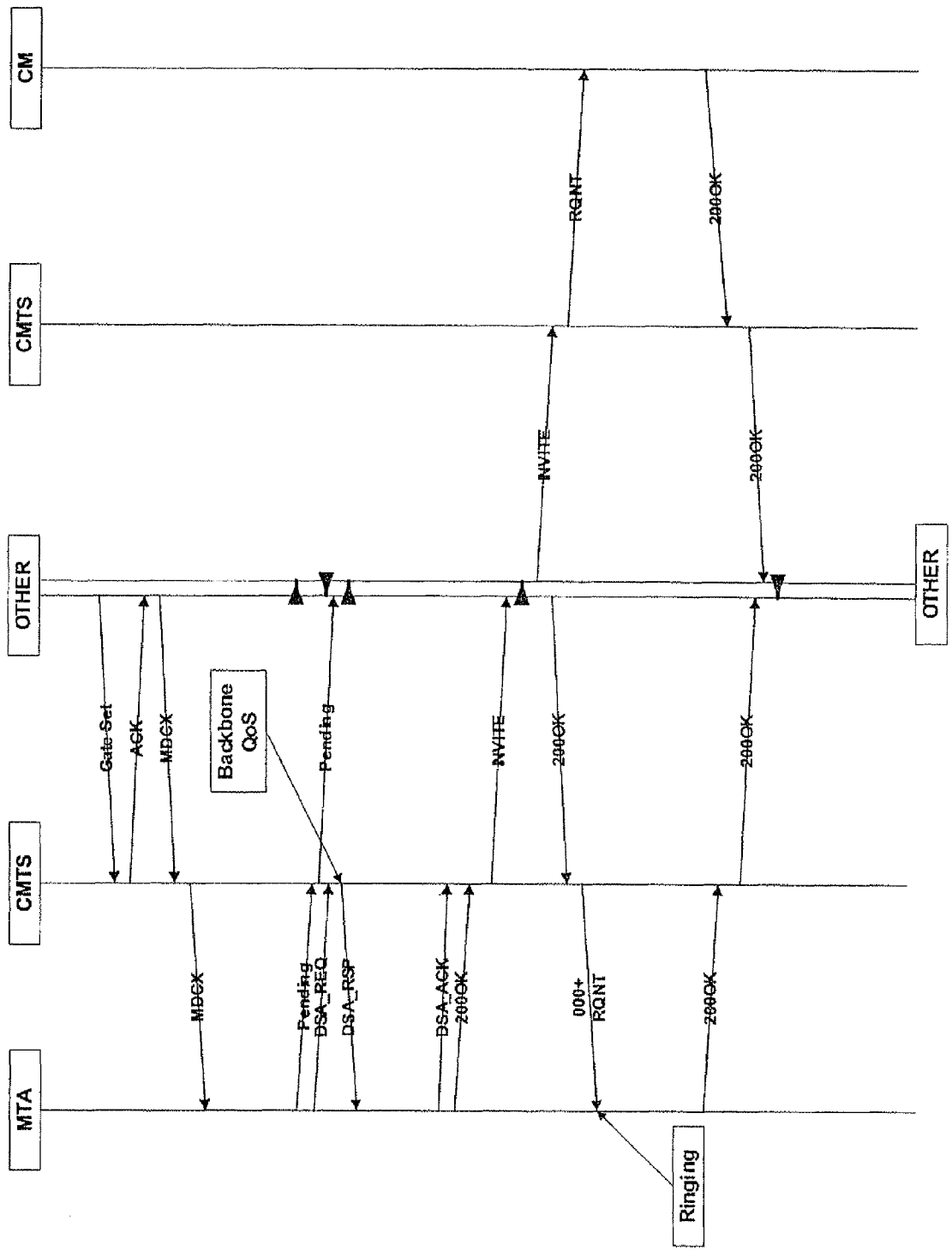
FIG. 9 illustrates a second portion of all of the messages passed in a NCS PacketCable call setup protocol flow.
Figure 10:
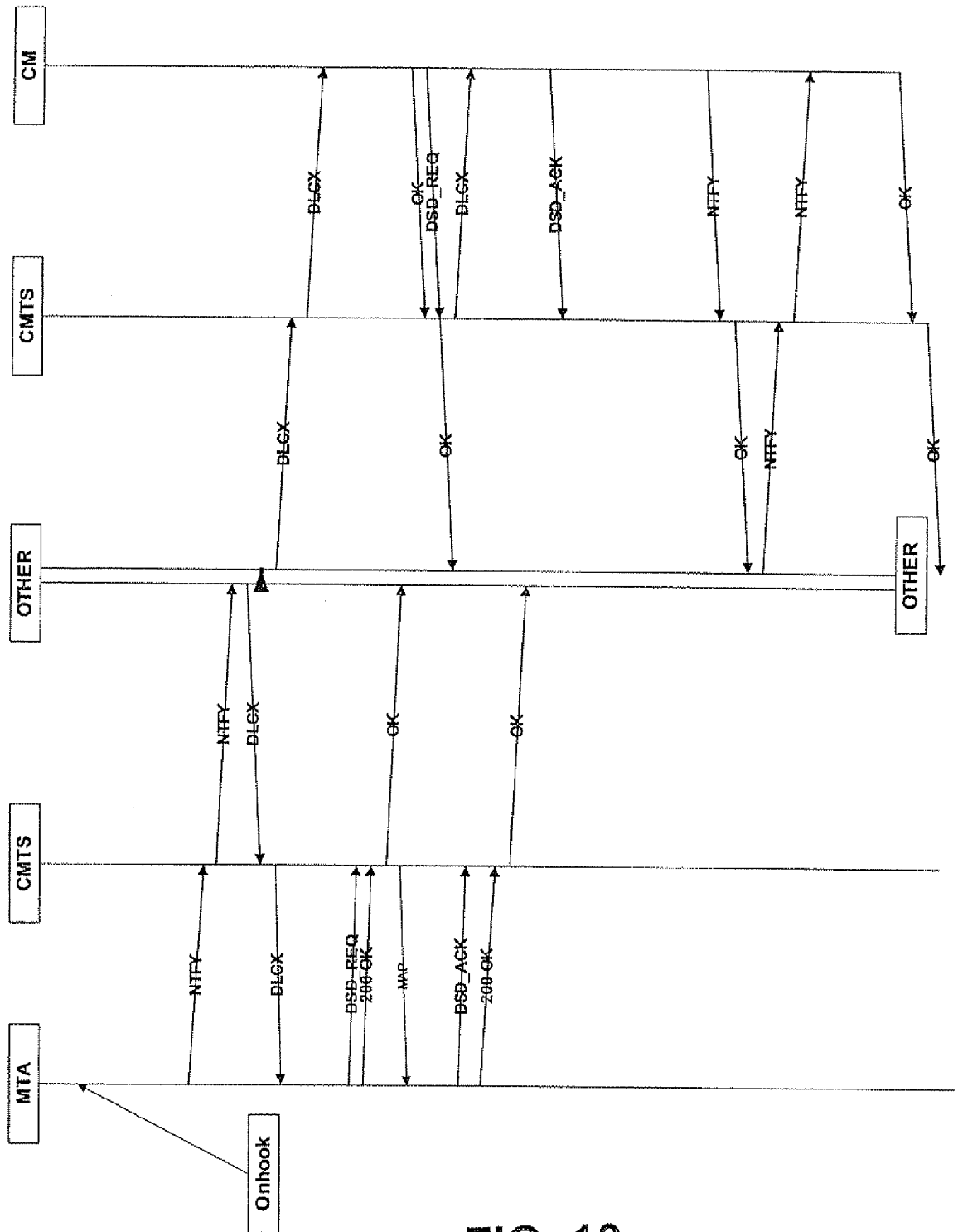
FIG. 10 illustrates a third portion of all of the messages passed in a NCS PacketCable call setup protocol flow.
Figure 11:
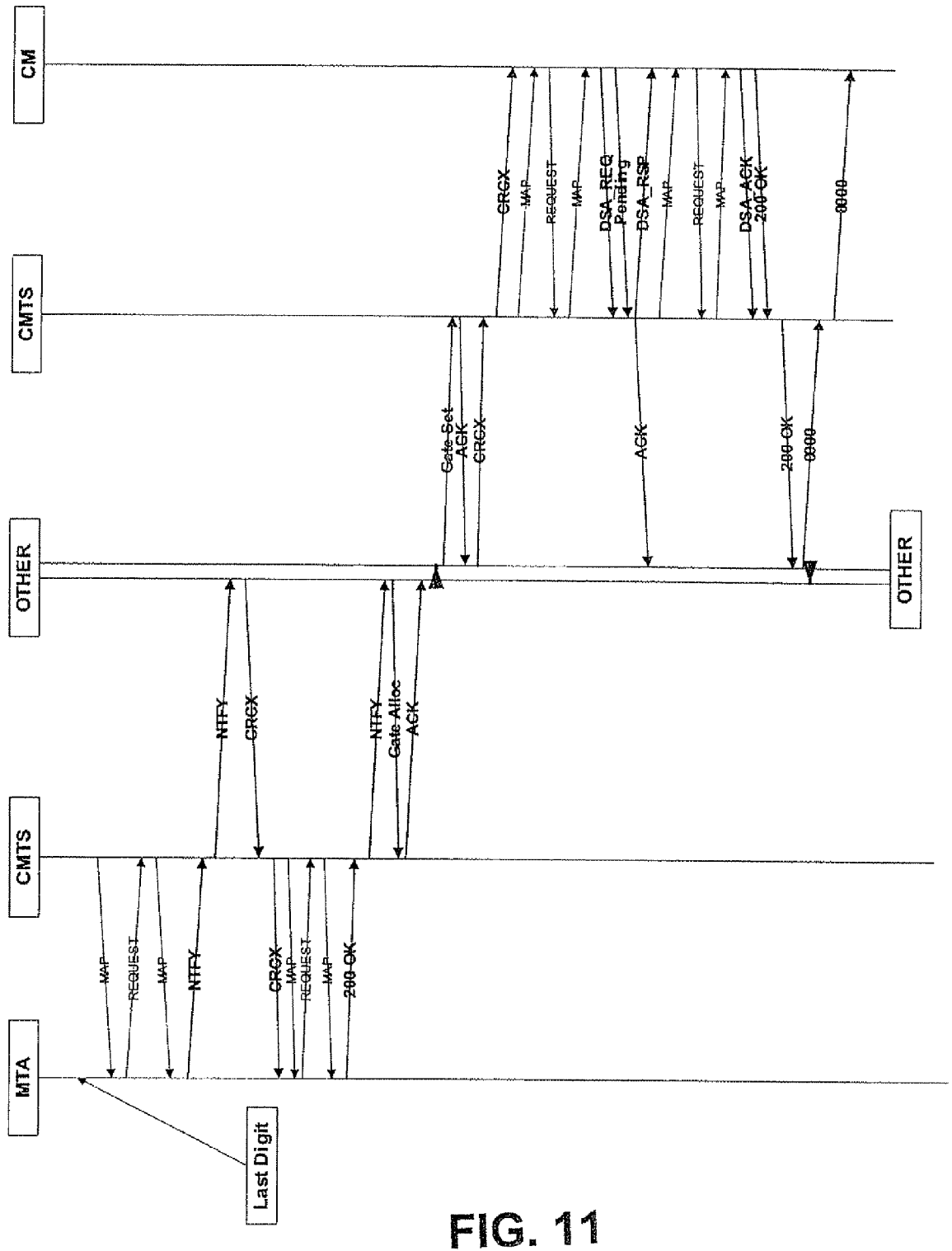
FIG. 11 illustrates a first portion of all the messages that are exchanged between the eMTA and the CMTS for transmission of the call signaling packets when using broadcast request opportunities.
Figure 12:
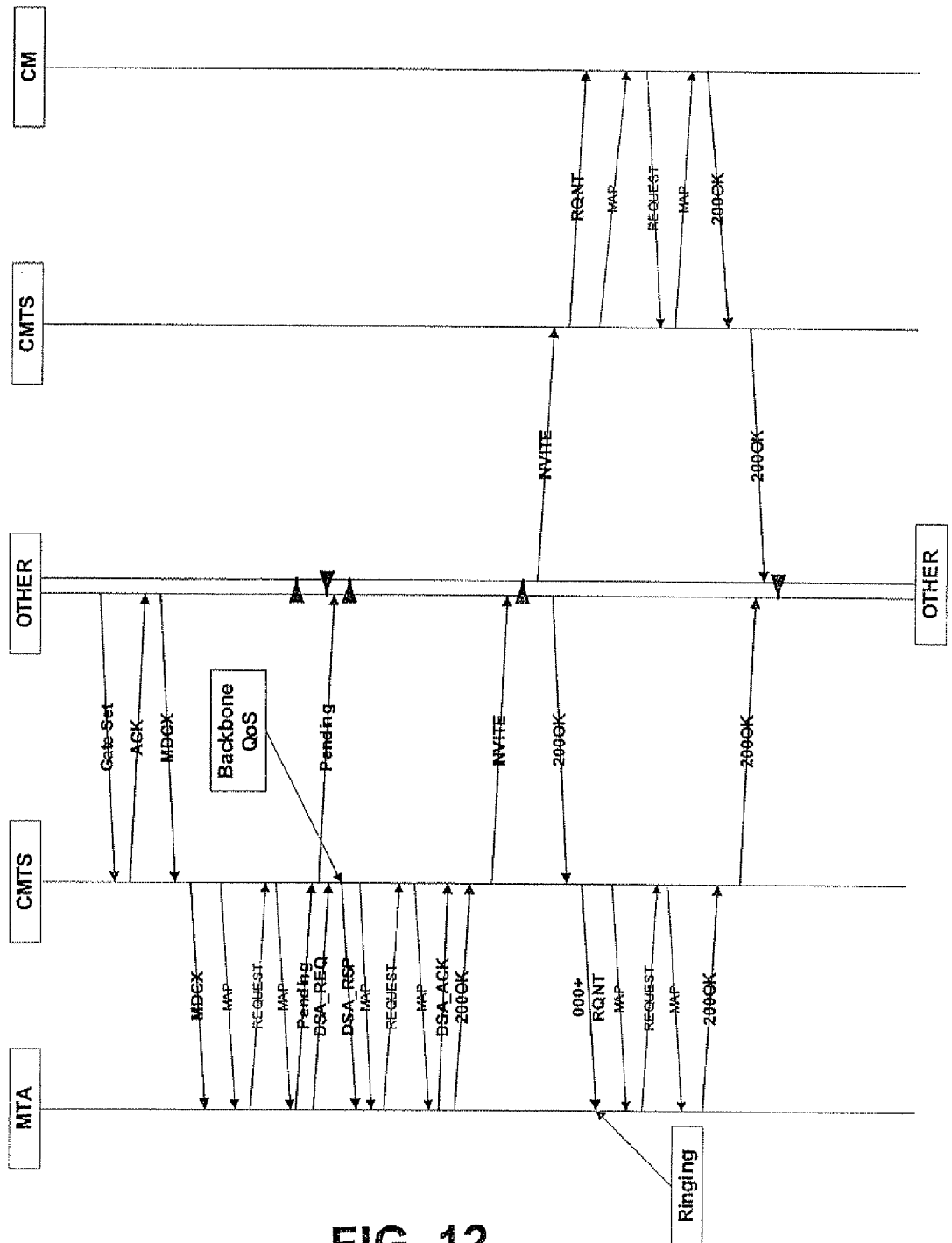
FIG. 12 illustrates a second portion of all the messages that are exchanged between the eMTA and the CMTS for transmission of the call signaling packets when using broadcast request opportunities.
Figure 13:
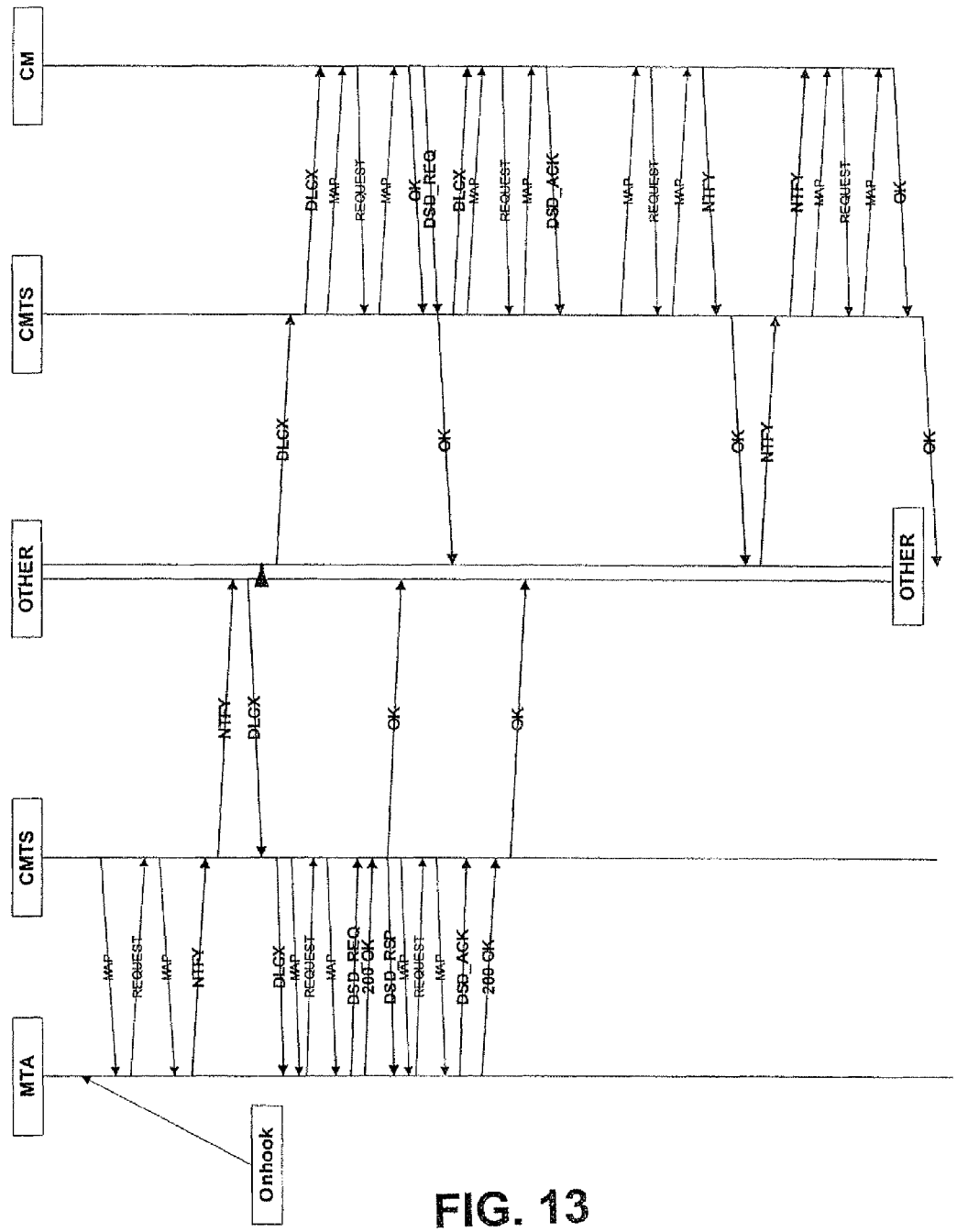
FIG. 13 illustrates a third portion of all the messages that are exchanged between the eMTA and the CMTS for transmission of the call signaling packets when using broadcast request opportunities.
Figure 14:
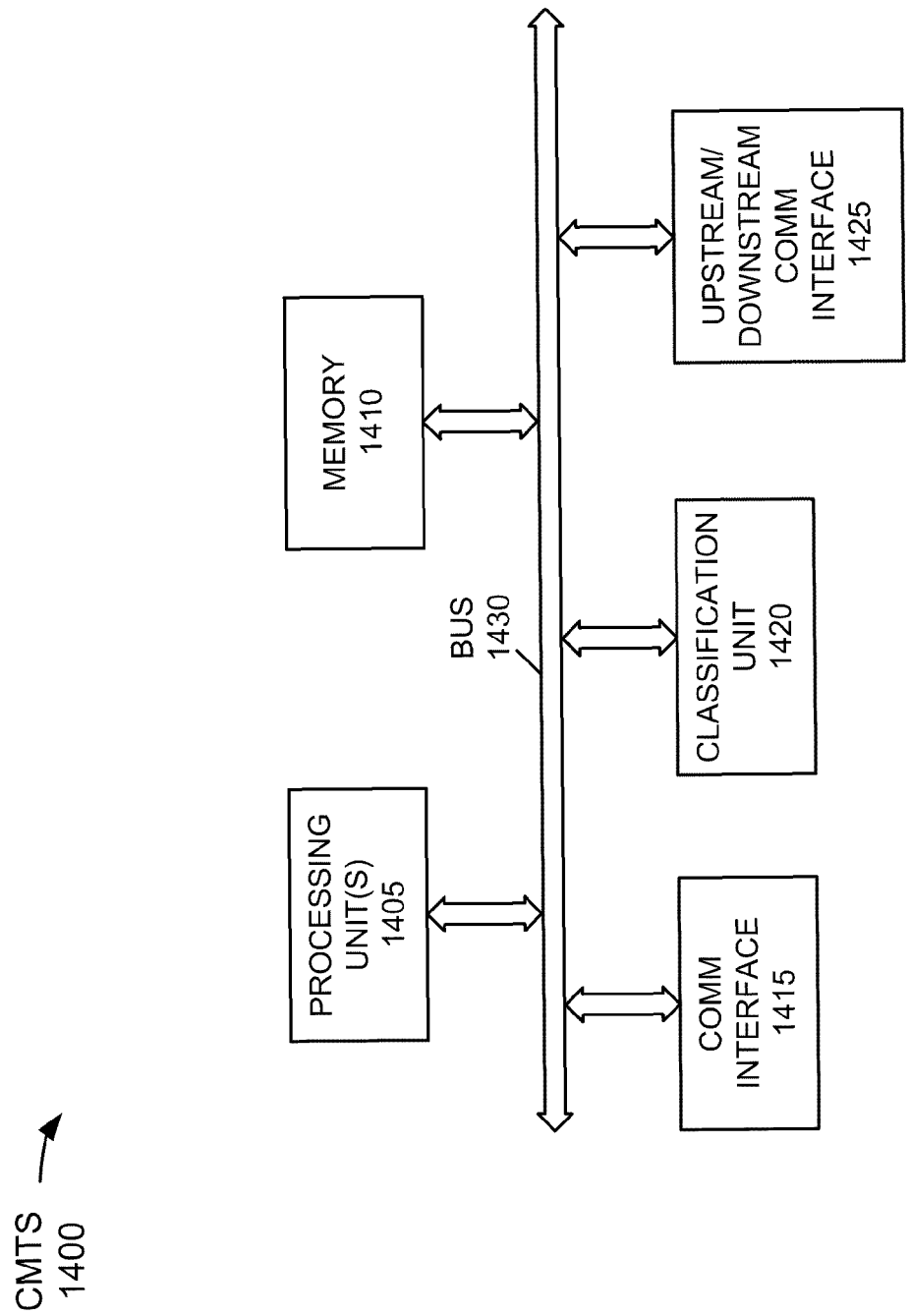
FIG. 14 illustrates an exemplary configuration of a CMTS in which systems and methods consistent with the principles of the invention may be implemented.

FIG. 14 illustrates an exemplary CMTS 1400 in which systems and methods, consistent with the present invention, may be implemented. CMTS 1400 may include one or more processing units 1405, a memory 1410, a communication interface 1415, a classification unit 1420, an upstream/downstream communication interface 1425, and a bus 1430.

Processing unit(s) 1405 may perform data processing functions for data transmitted/received via communication interface 1415 to/from a data network, such as a local area network (LAN), a wide area network (WAN), an intranet, the Internet, or the like, and data transmitted/received via upstream/downstream communication interface 1425 to/from a cable network. Memory 1410 may include Random Access Memory (RAM) that provides temporary working storage of data and instructions for use by processing unit 1405 in performing control and processing functions. Memory 1410 may additionally include Read Only Memory (ROM) that provides permanent or semi-permanent storage of data and instructions for use by processing unit 1405. Memory 1410 can also include large-capacity storage devices, such as a magnetic and/or optical recording medium and its corresponding drive.

Communication interface 1415 may include conventional circuitry well known to one skilled in the art for transmitting data to, or receiving data from, the data network. Classification unit 1420 may, as will be described in detail below, identify applications requesting service flows to determine the QoS to be applied to the service flows. CMTS 1400 may assign resources for the service flows based on the identification.

Upstream/downstream communication interface 1425 may include transceiver circuitry well known to one skilled in the art for transmitting data bursts on downstream channels, and receiving data bursts on upstream channels, via the cable network. Such transceiver circuitry may include amplifiers, filters, modulators/demodulators, interleavers, error correction circuitry, and other conventional circuitry used to convert data into radio frequency (RF) signals for transmission via the cable network, or to interpret data bursts received from CMs via the cable network as data symbols.

Bus 1430 interconnects the various components of CMTS 1400 to permit the components to communicate with one another.

Exemplary Processing

When scheduling resources, such as upstream or downstream bandwidth, a CMTS may allocate more resources to those applications (e.g., voice, video, and other high-speed multimedia applications) requiring better performance (e.g., lower delays, less dropped packets, etc.). On the other hand, the CMTS may allocate less resources to less-demanding applications, such as web surfing applications. In either case, the CMTS needs to be able to identify an application so that the appropriate amount of resources can be allocated.

Figure 15:
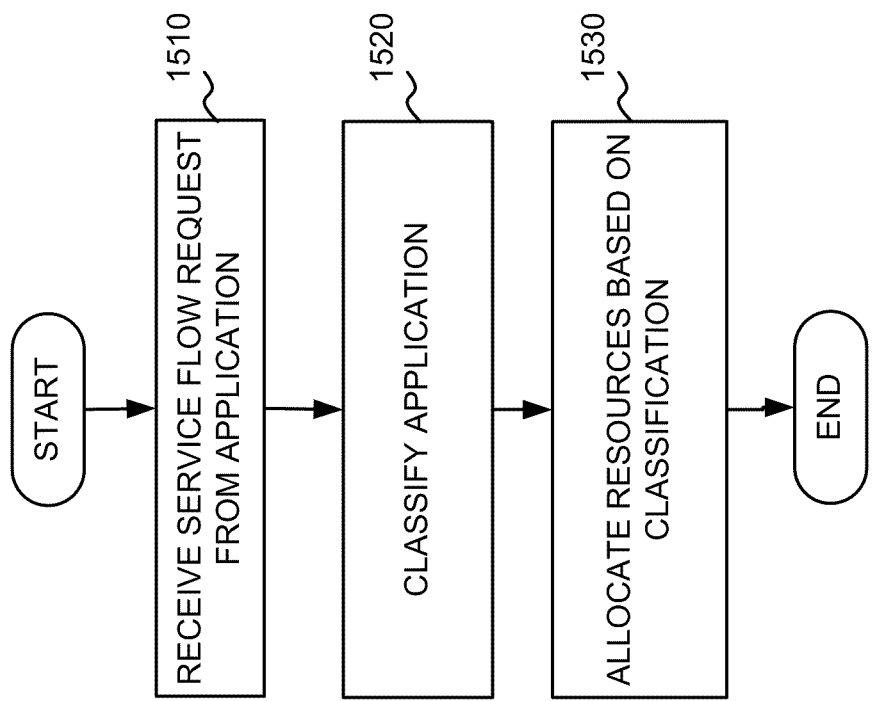
FIG. 15 illustrates an exemplary process for scheduling resources in an implementation consistent with the principles of the invention.

FIG. 15 illustrates an exemplary process for allocating resources in an implementation consistent with the present invention. Processing may begin with a CMTS, such as CMTS 1400, receiving a service flow creation request from an application via a CM [act 1510]. The application may, for example, be a higher priority application, such as a VoIP-related application, where packet dropping and delays are less acceptable to an end-user or a lower priority application, such as a web surfing application. CMTS 1400 may give preference to higher priority applications when assigning system resources.

CMTS 1400 may then classify the application based on the request [act 1520]. The classification may be based on a Service Class Name associated with the application or an application name provided by some external process, such as an external QoS authorization process (e.g., PacketCable DQoS Gate Control) and RSVP+ messaging with PacketCable extensions or the Internet standard RSVP protocol with Application and Sub-Application identity policy elements.

The CMTS scheduler can use the application information and IP packet flow in other flows other than the scheduling is running against to make decisions. For example, if CMTS 1400 knows when a packet is sent downstream for the application, it is possible for the context dependent scheduling (CDS) to predict (in general, the application processing does not take time) when the application would generate an upstream packet. If the application is VoIP, for example, considered before it is apparent that the VOIP call has entered the ringing state, the VoIP application response time depends on the processing of the message by the NCS/DQoS stack. For this reason, if CMTS 1400 has the ability to detect the VoIP call signaling packets, for example, due to the DiffServ markings and destination IP address, the CDS can anticipate that an upstream packet is to be generated by the VoIP application and schedule a request and/or data opportunity in anticipation of the packet to be generated by the application.

The choice of the CDS to give a request and/or data opportunity depends on several factors. Some of these factors include the determinism of the upstream packet generation, certainty of the expected packet size, and bandwidth utilization at that instant. If the application would most probably generate a packet having a size of, for example, 430 bytes, then it is possible for the CDS to schedule a 430 byte data opportunity for the next MAP message (assuming that the anticipated time is before the scheduled time). It may then be possible to use unicast polling with a frequency of 100 msec, which will only affect the first packet sent upstream during the messaging bursts. From that point on, however, the latency will be contained to anticipated packet generation time, which for all practical purposes can be considered as 4 msec (assuming 1 msec delay in downstream, 1 msec in the inter-protocol communication, 1 msec for the NCS/DQoS protocol stack, and 1 msec for the inter-protocol communication), making the upstream cable transport delay around 5 msec. If there are 5 messages occurring for the call setup, then the total time is:

50 (average poll wait)+1(upstream delay)+4*5=71 msec.

It is important to note that for a unicast polling system to reach this response time, the polls should occur with the frequency of:

(71 msec–5 msec (upstream propagation time)/5(no. upstream messages)*2(normalize the average number)=26.4 msec, which is almost a fourth of what is being used as the polling interval.

Identification Using Service Class Name

The DOCSIS definition for QoS includes a Service Class Name field. A Service Class Name is a string, which the CMTS associates with a QoS Parameter Set. The Service Class serves the following purposes that are described in DOCSIS RFI v1.1 specification:

1. It allows operators, who so wish, to move the burden of configuring service flows from the provisioning server to the CMTS. Operators provision the CMs with the Service Class Name. The implementation of the name may be configured at the CMTS via a command-line interface (CLI). This allows operators to modify the implementation of a given service without changing CM provisioning. For example, some scheduling parameters may need to be tweaked differently for two different CMTSs to provide the same service. As another example, service profiles could be changed by time of day.

2. It allows CMTS vendors to provide class-based-queuing if they choose, where service flows compete within their class and classes compete with each other for bandwidth.

3. It allows higher-layer protocols to create a service flow by its Service Class Name. For example, telephony signaling may direct the CM to instantiate any available provisioned service flow of class "G711."

4. It allows packet classification policies to be defined which refer to a desired service class, without having to refer to a particular service flow instance of that class.

5. CMTS implementations may treat such "unclassed" flows differently from "classed" flows with equivalent parameters.

The Service Class Name may be used in the Registration, Dynamic Service Addition Request (DSA-REQ), and Dynamic Service Change Request (DSC-REQ) messages generated by the CM. In all of these cases, CMTS 1400 may include a Service Flow Encoding that includes the Service Class Name and the QoS Parameter Set of the Service Class.

CMTS 1400 may identify applications based on the Service Class Names. For example, assume that VoIP applications use the Service Class Name "voipcallsignalingupstream" for PacketCable upstream call signaling and "voipcallsignalingdownstream" for PacketCable downstream call signaling. An operator may define these names as being associated with PacketCable Call Signaling in CMTS 1400 using the CLI. Since the embedded multimedia terminal adapters (eMTAs) uses Service Class Names when requesting a service flow to be created, CMTS 1400 may readily identify the applications associated with the Service Class Names. For example, if CMTS 1400 receives a service flow request that includes the Service Class Name "voipcallsignalingupstream," CMTS 1400 may determine that the requesting application is associated with PacketCable Call Signaling.

Identification Using External Processes

If CMTS 1400 does not use the CM-originating Service Class Name, CMTS 1400 may use the PacketCable DQoS Gate Control message and RSVP+ messaging with Packet- Cable extensions for application identification purposes. The PacketCable DQoS specification, dated Jan. 16, 2002, pages 1-225, the entire contents of which are incorporated by reference herein, defines a gate as a policy control entity implemented at the CMTS to control access to enhanced QoS Services of a DOCSIS 1.1 cable network by a single IP flow. Gates are unidirectional (i.e., gates control access to a flow in either the upstream or downstream direction). In an implementation consistent with the principles of the invention, each gate includes the following fields:

Gate-ID,
Prototype Classifier,
A group of flags,
An authorized envelope (flow spec),
A reserved envelope (flow spec),
Resource-ID, and
Application Name.

The Gate-ID field includes a local 32 bit identifier that is allocated from the local space at the CMTS where the gate resides. Typically, a Gate-ID identifies a single upstream flow and a single downstream flow, and corresponds to a single multimedia session. The Prototype Classifier field may consist of direction information (i.e., upstream or downstream), protocol information, source IP information that identifies the source of the flow, destination IP information that identifies the destination of the flow, destination port information that identifies the port at the destination device to which the flow is directed, and source port information that identifies the port on the source device from which the flow originates.

The group of flags may include an auto-commit flag and a commit-not-allowed flag. The auto-commit flag, when set, causes CMTS 1400 to commit resources immediately upon reservation. The commit-not-allowed flag, when set, causes CMTS 1400 to ignore any COMMIT messages for this particular gate.

The Authorized and Reserved Envelopes are RSVP Flow Specs (both TSpec and RSpec) that identifies the resources that are being reserved for this service flow. The Resource-ID field may include a local 32-bit identifier that is allocated from the local space at the CMTS where the gate resides. It will be appreciated that any number of gates may share a resource-ID, and therefore share a common set of resources, with the restriction that only one of these gates in each direction has resources committed.

The Application Name field may identify the originating application. When a new service flow is to be created using an RSVP+ message (as defined by the PacketCable DQoS specification), CMTS 1400 may use the Gate-ID from the RSVP+ message to find the gate to which the application is assigned. Once the gate is identified, CMTS 1400 may identify the application from the Application Name field included in the gate. In other implementations, it may be possible to include sub-application names at the gate to allow for differentiation between various applications/payment groups/provider classes.

Identification Using RFC2872-Defined RSVP Fields

RFC2872 defines application and sub-application identity policy elements for use with RSVP. The RFC2872 policy elements may include an identifier that uniquely identifies the application vendor, an application identifier, an application version number, and a sub-application identifier. In one exemplary implementation, the Gate Control protocol may be modified to include an Application Name field and an Application X.500 field. The Application Name field may include an ASCII string representing the name of the application. The Application X.500 field may include a distinguished name as is well known in the art. In an alternative implementation, an operator may store application identifying information, such as an application name, at CMTS 1400. The operator may, for example, store the application identifying information in memory 1410. In each of these exemplary implementations, wild cards may be used for multiple unknown characters and question marks for a specific character may be used as well. For example, "*VoIP*SIP*" may be used as application identifying information for a VoIP application SIP sub-application. Such application identifying information would accept the following exemplary application name fields in the RSVP message:

Microsoft VoIP protocol SIP v1.00.exe
Generic VoIP SIP.exe
Voip_sip.exe.

CMTS 1400 may identify an application by comparing the application name field in a RSVP message to the application identifying information from the Gate Control protocol or to the application identifying information stored in memory 1410.

Once the application is identified, CMTS 1400 may allocate (or schedule) resources for the application based on the identification [act 1530]. If, for example, CMTS 1400 identifies the application as a high priority application, such as a voice, video, or multimedia-related application, CMTS 1400 may give preference to system resources with respect to these types of applications.

Figure 16:
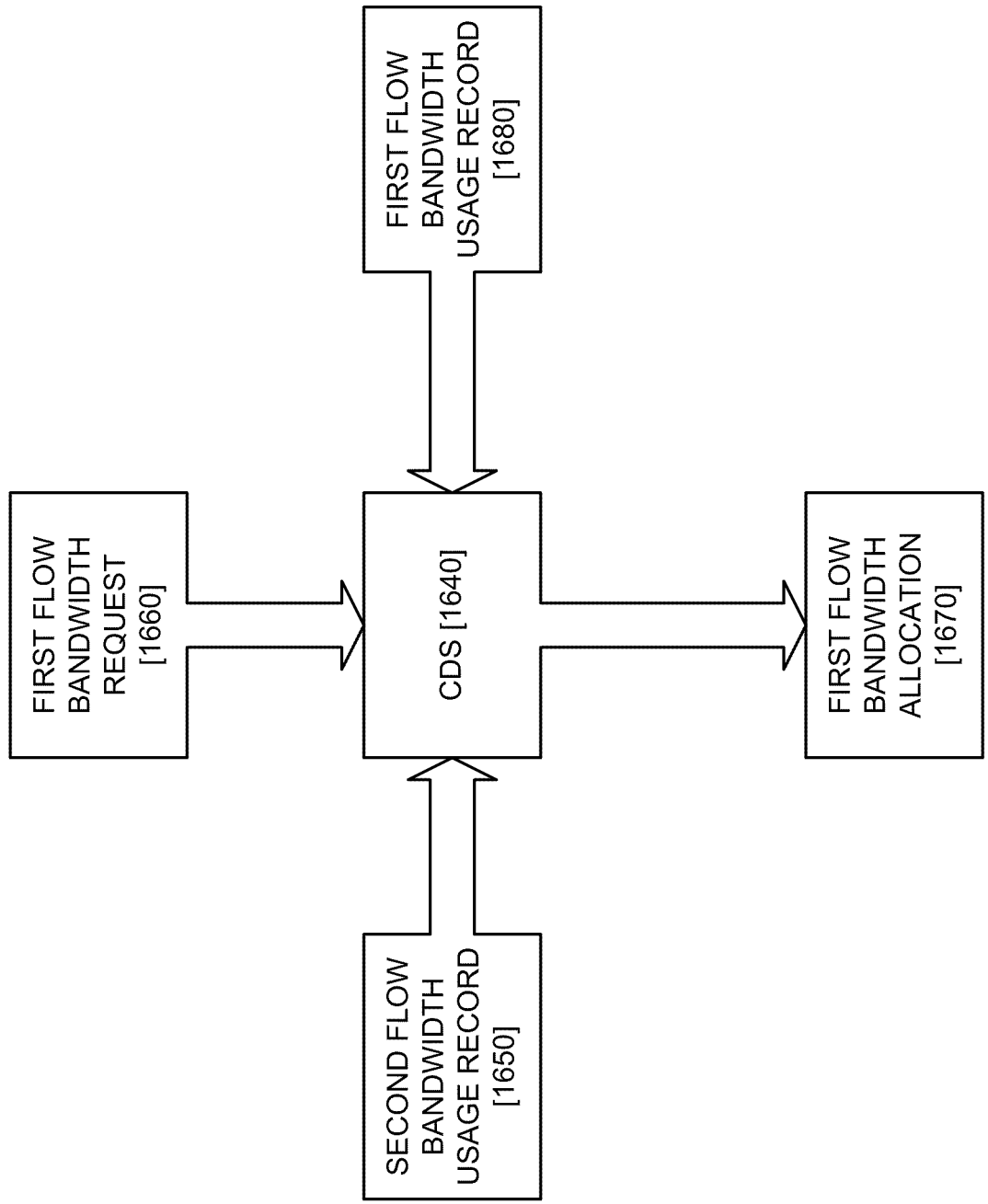
FIG. 16 illustrates the allocation of resources by a context dependent scheduler in an implementation consistent with the principles of the invention.

When the decision to use a specific Context Dependent Scheduler 1640 is made using the application decision, the scheduling is carried out using the second flow information 1650 and first flow information 1670 and first flow bandwidth request 1660 to make a decision on how to allocate resources for the first flow 1680, as illustrated in FIG. 16.

CONCLUSION

Systems and methods consistent with the present invention identify applications requesting service flows in a cable modem communications environment. A CMTS may identify applications using Service Class Names, or other application identifying information from external processes. When scheduling resources, a CMTS may allocate more resources to those applications (e.g., voice, video, and other high-speed multimedia applications) identified as requiring enhanced performance (e.g., lower delays, less dropped packets, etc.). On the other hand, the CMTS may allocate fewer resources to less-demanding applications, such as web surfing applications.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, the above implementations can be implemented in software, hardware, or a combination of software and hardware. Thus, the present invention is not limited to any specific combination of hardware circuitry and software.

While a series of acts has been described with regard to FIG. 15, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method comprising:
   receiving, via a Cable Modem Termination System (CMTS), a first allocation request for a first flow from a first application and a second allocation request for a second flow from a second application,
   the first allocation request including a resource reservation protocol message that includes a gate identifier;
   identifying, via the CMTS, a type of the first application based on the gate identifier that is included in the resource reservation protocol message of the first allocation request; and
   scheduling, via the CMTS, resources, for the first flow, based on the identified type of the first application and information associated with the second flow.

2. The method of claim 1, where scheduling the resources further comprises:
   identifying a quality of service parameter set based on a service class name associated with the first allocation request, and
   scheduling the resources for the first flow further based on the quality of service parameter set.

3. The method of claim 2, where the second allocation request includes one of a Registration message, a Dynamic Service Addition message, or a Dynamic Service Change message.

4. The method of claim 2, where identifying the type of the first application further includes:
   comparing a service class name associated with the first allocation request to stored application identifiers, and
   identifying the type of the first application further based on comparing the service class name to the stored application identifiers.

5. The method of claim 1, where scheduling the resources for the first flow includes:
   predicting a size of a data packet that is to be generated by the first application based on the type of the first application, and
   scheduling the resources based on the predicted size of the data packet and the information associated with the second allocation request.

6. The method of claim 1, where the gate identifier is associated with a gate of the CMTS.

7. The method of claim 1, further comprising:
   including, via the CMTS, a service flow encoding that includes a service class name associated with the first allocation request and includes a Quality of Service (QoS) parameter set of a service class associated with the service class name.

8. The method of claim 1, where identifying the type of the first application includes:
   identifying the type of the first application further based on a service class name included in the first allocation request.

9. The method of claim 1, where identifying the type of the first application includes:
   determining an application name using the gate identifier, comparing the application name to stored application identifiers, and
   identifying the type of the first application further based on comparing the application name to the stored application identifiers.

10. The method of claim 1,
    where the resource reservation protocol message further includes application identification information that identifies at least one of:
    an application vendor,
    an application identifier,
    an application version number, or
    a sub-application identifier, and
    where identifying the type of the first application includes:
    identifying the type of the first application further based on the at least one of the application vendor, the application identifier, the application version number, or the sub-application identifier.

11. The method of claim 10,
    where the application identification information identifies the sub-application identifier, and
    where identifying the type of the first application further includes:
    identifying the type of the first application based on the sub-application identifier.

12. The method of claim 10, where identifying the type of the first application further includes:
    comparing the application identification information to stored application identifiers.

13. The method of claim 10, where identifying the type of the first application further includes:
    comparing the application identification information to information in a gate control protocol.

14. A system comprising:
    a network device to:
    receive a first request, for a first flow, from a first application and a second request from a second application,
    the first request being received via a cable modem termination system over a cable network, and
    the first request including a resource reservation protocol message that includes a gate identifier;
    identify a type of the first application based on the gate identifier that is included in the resource reservation protocol message of the first request; and
    schedule resources, for the first flow, based on the type of the first application and information associated with the second request.

15. The system of claim 14,
    where the first request further includes a service class name, and
    where, when identifying the type of the first application, the network device is further to:
    compare the service class name to a group of stored application identifiers.

16. The system of claim 14, where, when identifying the type of the first application, the network device is further to:
    determine an application name using the gate identifier, and
    compare the application name to a group of stored application identifiers.

17. The system of claim 14,
    where the resource reservation protocol message further includes application identification information, and
    where, when identifying the type of the first application, the network device is further to:
    compare the application identification information to a group of stored application identifiers.

18. A non-transitory computer-readable medium storing instructions, the instructions comprising:

one or more instructions that, when executed by at least one component of a network device, cause the at least one component to:
- receive a first request for a first flow from an application via a cable modem network,
  - the first request including a resource reservation protocol message that includes a gate identifier;
- receive a second request from a second application via the cable modem network;
- identify a type of the first application based on the gate identifier that is included in the resource reservation protocol message of the first request; and
- schedule an amount of resources, for the first flow, based on the type of the first application and information associated with the second request.

19. The non-transitory computer-readable medium of claim 18, where the one or more instructions to identify the type of the first application include:
- one or more instructions that, when executed by the at least one component, cause the at least one component to:
  - identify the type of the first application as one of a higher priority application or a lower priority application.

20. The non-transitory computer-readable medium of claim 18,
where the second request includes a service class name, and
where the instructions further comprise:
- one or more instructions that, when executed by the at least one component, cause the at least one component to:
  - compare the service class name to a group of stored application identifiers,
  - identify another type of the second application based on comparing the service class name, and
  - scheduling other resources for the second application based on the other type.

21. The non-transitory computer-readable medium of claim 18,
where the second request includes a service class name, and
where the instructions further comprise:
- one or more instructions that, when executed by the at least one component, cause the at least one component to:
  - include, for the second request, a service flow encoding that includes the service class name and includes a Quality of Service (QoS) parameter set of a service class associated with the service class name.

* * * * *